United States Patent
Burrows et al.

(10) Patent No.: US 9,589,057 B2
(45) Date of Patent: Mar. 7, 2017

(54) FILTERING CONTENT ON A ROLE TAILORED WORKSPACE

(71) Applicant: Microsoft Technology Licensing, LLC, Redmond, WA (US)

(72) Inventors: John P Burrows, Redmond, WA (US); Ted A Cyrek, Redmond, WA (US); Jeremy S Ellsworth, Redmond, WA (US); Sunil Garg, Redmond, WA (US); Chris R Garty, Redmond, WA (US); Brian R Glaeske, Redmond, WA (US); Julie B Hagen, Redmond, WA (US); Claudia Betz-Haubold, Redmond, WA (US); Wayne C Higgins, Redmond, WA (US); Kevin M Honeyman, Redmond, WA (US); Rupa Mantravadi, Redmond, WA (US); Michael J McCormack, Redmond, WA (US); Lisa R Mueller, Redmond, WA (US); Adrian L Orth, Redmond, WA (US); Anastasia Paushkina, Redmond, WA (US); Julianne Prekaski, Redmond, WA (US); Ray J Ridl, Redmond, WA (US); Michael M Santos, Redmond, WA (US); Prasant Sivadasan, Redmond, WA (US); Brian L Welcker, Redmond, WA (US); Kyle S Young, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 13/913,049

(22) Filed: Jun. 7, 2013

(65) Prior Publication Data
US 2014/0365511 A1 Dec. 11, 2014

(51) Int. Cl.
*G06F 17/30* (2006.01)
*G06Q 10/06* (2012.01)

(52) U.S. Cl.
CPC .. *G06F 17/30867* (2013.01); *G06F 17/30604* (2013.01); *G06F 17/30699* (2013.01); *G06Q 10/06* (2013.01)

(58) Field of Classification Search
CPC ......... G06F 17/30867; G06F 17/30604; G06F 17/30699; G06Q 10/06
(Continued)

(56) References Cited

U.S. PATENT DOCUMENTS 5,233,687 A 8/1993 Henderson, Jr. et al.
6,950,990 B2 9/2005 Rajarajan et al.
(Continued)

OTHER PUBLICATIONS

Non-Final Office Action for U.S. Appl. No. 13/913,046 dated Feb. 27, 2015, 17 pages.
(Continued)

*Primary Examiner* — Phong Nguyen
(74) *Attorney, Agent, or Firm* — Thomas Marquis; Kate Drakos; Micky Minhas

(57) ABSTRACT

A workspace display includes a plurality of different groups, each group including a plurality of different components. Each group corresponds to a task, set of tasks or topic of information related to a user's role. The particular components included in each group are user interface display elements that are each related to an item of content within the corresponding group. The workspace display has filter mechanisms that are actuated to filter the content displayed in the components on the workspace display.

20 Claims, 29 Drawing Sheets

(58) Field of Classification Search
USPC .......................................... 707/754, E17.059
See application file for complete search history.

(56) References Cited

U.S. PATENT DOCUMENTS

| | | | |
|---|---|---|---|
| 7,117,452 B1 | 10/2006 | Pavelski et al. | |
| 7,761,800 B2* | 7/2010 | Chaudhri | B60K 35/00 715/764 |
| 7,917,869 B2* | 3/2011 | Anderson | G06F 3/016 715/733 |
| 7,933,632 B2 | 4/2011 | Flynt et al. | |
| 8,214,747 B1 | 7/2012 | Yankovich et al. | |
| 8,276,095 B2 | 9/2012 | Cutler et al. | |
| 8,296,200 B2 | 10/2012 | Mangipudi et al. | |
| 8,332,470 B2* | 12/2012 | Arun | G06Q 10/10 709/204 |
| 8,417,728 B1* | 4/2013 | Anders | G06F 8/34 707/793 |
| 2002/0116182 A1* | 8/2002 | Gao | G10L 21/0364 704/205 |
| 2005/0015742 A1 | 1/2005 | Wood et al. | |
| 2005/0235011 A1* | 10/2005 | Minium, Jr. | G06F 17/30598 707/999.203 |
| 2006/0190833 A1 | 8/2006 | SanGiovanni et al. | |
| 2006/0195583 A1* | 8/2006 | Bellifemine | G06F 17/30867 709/227 |
| 2007/0157089 A1 | 7/2007 | Van Os et al. | |
| 2009/0265634 A1 | 10/2009 | Beringer et al. | |
| 2009/0300016 A1* | 12/2009 | Kile, Jr. | G06F 3/04817 707/E17.001 |
| 2011/0087982 A1 | 4/2011 | McCann et al. | |
| 2011/0145863 A1* | 6/2011 | Alsina | G06F 9/4445 725/44 |
| 2011/0213789 A1* | 9/2011 | Doshi | G06F 21/6218 707/754 |
| 2011/0313805 A1* | 12/2011 | Heydemann | G06Q 10/06 705/7.14 |
| 2012/0059717 A1* | 3/2012 | Furman | G06Q 30/02 705/14.53 |
| 2012/0079429 A1 | 3/2012 | Stathacopoulos et al. | |
| 2012/0246596 A1 | 9/2012 | Ording et al. | |
| 2012/0304095 A1 | 11/2012 | Dennis | |
| 2013/0091132 A1 | 4/2013 | Khalatov et al. | |
| 2013/0290825 A1* | 10/2013 | Arndt | G06Q 10/10 715/227 |
| 2014/0215383 A1 | 7/2014 | Park-Ekecs et al. | |
| 2014/0365263 A1 | 12/2014 | Honeyman et al. | |
| 2014/0365952 A1 | 12/2014 | Honeyman et al. | |

OTHER PUBLICATIONS

Amendment for U.S. Appl. No. 13/913,046 dated May 18, 2015, 10 pages.
"Windows UI View", Retrieved at <<http://documentation.devexpress.com/#WindowsForms/CustomDocument11358>>, Retrieved Date: Mar. 25, 2013, p. 1.
Richards, Josh, "Microsoft Dynamics AX Role Tailored User Interface Provides Insight and Productivity", Retrieved at <<http://community.dynamics.com/ax/b/meritmatters/archive/2012/12/07/microsoft-dynamics-ax-role-tailored-user-interface-provides-insight-and-productivity.aspx>>, Dec. 7, 2012, pp. 2.
Prosecution History for U.S. Appl. No. 13/911,094 including: Non-Final Office Action dated Jul. 29, 2015, Applicant Response to Notice to File Corrected Application Papers dated Jul. 19, 2013 and Notice to File Corrected Application Papers dated Jul. 5, 2013, 49 pages.
"International Preliminary Report on Patentability Issued in PCT Patent Application No. PCT/US2014/040580", Mailed Date: Aug. 25, 2015, 8 Pages.
International Written Opinion for International Application No. PCT/US2014/040580, date of mailing: Apr. 17, 2015, date of filing: Jun. 3, 2014, 7 pages.
"International Search Report & Written Opinion for PCT Patent Application No. PCT/US2014/040580", Mailed Date: Sep. 4, 2014, 11 Pages.
"Microsoft Dynamics AX 2012: A New Generation in ERP", Retrieved at <<http://www.ignify.com/Dynamics_AX_2012_ERP.asp>> Jul. 11, 2011, pp. 5.
"Customize Your Workspace", Retrieved at <<https://prod.help.rallydev.com/customize-your-workspace#multipleworkspaces>> Retrieved Date: Mar. 21, 2013, pp. 7.
Voida, Stephen, "Exploring User Interface Challenges in Supporting Activity-Based Knowledge Work Practices", Retrieved at <<https://smartech.gatech.edu/jspui/bitstream/1853/24721/1/voida_stephen_200808_phd.pdf>> In Partial Fulfillment of the Requirements for the Degree, Doctor of Philosophy in Computer Science in the School of Interactive Computing, Oct. 2008, 232 pages.
Prosecution History for U.S. Appl. No. 13/913,046 including: Applicant Initiated Interview Summary dated Oct. 29, 2015 and Amendment with RCE dated Oct. 27, 2015, 17 pages.
Amendment for U.S. Appl. No. 13/911,094 dated Nov. 10, 2015, 12 pages.
Non-Final Office Action for U.S. Appl. No. 13/913,046 dated Nov. 20, 2015, 26 pages.
International Search Report and Written Opinion for International Application No. PCT/US 14/40777, date of mailing: Jun. 19, 2015, date of filing: Jun. 4, 2014, 15 pages.
Final Office Action for U.S. Appl. No. 13/913,046 dated Jul. 15, 2015, 20 pages.
Final of Action for U.S. Appl. No. 13/911,094 dated Jan. 12, 2016, 20 pages.
Amendment for U.S. Appl. No. 13/913,046 dated Feb. 10, 2016, 13 pages.
Final Office Action for U.S. Appl. No. 13/913,046 dated May 5, 2016, 22 pages.

* cited by examiner

PROJECT SHARE VIEW

ACME WORKS

Summary  Activities & schedule  Resources  Budget  Calendar  Documents  Issues

[Open issues ▼]

306

ACME

| Issue Id | Issue Name | Created | Opened By | Assigned To | Status | Priority |
|---|---|---|---|---|---|---|
| 1112 | Budget reduced | 11/19/11 | Michael | Jim | Open | Low |
| 1113 | Contractor OOF | 11/25/11 | Tricia | Jim | Open | High |
| 1114 | Incomplete Document | 11/30/11 | Jim | Michael | Open | Low |
| 1115 | Vacation plans | 12/05/11 | Tricia | Jim | Open | Medium |
| 1115 | Application load time | 12/12/11 | Tricia | Jim | Open | Critical |
| 1116 | Updated customer docs | 12/23/11 | June | Michael | Open | Low |
| 1117 | Duplicate time entry | 1/07/12 | Jim | Tricia | Open | Medium |
| 1118 | Missing expenses | 01/17/13 | Jim | Tricia | Open | High |
| 1119 | Delayed purchase order | 02/19/13 | Arnie | Jim | Open | Medium |

FIG. 3F

FILTERING CONTENT ON A ROLE TAILORED WORKSPACE

BACKGROUND

Computer systems are very common today. In fact, they are in use in many different types of environments.

Business computer systems are also in wide use. Such business systems include customer relations management (CRM) systems, enterprise resource planning (ERP) systems, line-of-business (LOB) systems, etc. These types of systems often include business data that is stored as entities, or other business data records. Such business data records (or entities) often include records that are used to describe various aspects of a business. For instance, they can include customer entities that describe and identify customers, vendor entities that describe and identify vendors, sales entities that describe particular sales, quote entities, order entities, inventory entities, etc. The business systems also commonly include process functionality that facilitates performing various business processes or tasks on the data. Users log into the business system in order to perform business tasks for conducting the business.

Such business systems also currently include roles. Users are assigned one or more roles, based upon the types of tasks they are to perform for the business. The roles can include certain security permissions, and they can also provide access to different types of data records (or entities), based on a given role.

Business systems can also be very large. They contain a great number of data records (or entities) that can be displayed or manipulated through the use of thousands of different forms. Therefore, visualizing the data in a meaningful way can be very difficult.

The discussion above is merely provided for general background information and is not intended to be used as an aid in determining the scope of the claimed subject matter.

SUMMARY

A workspace display includes a plurality of different groups, each group including a plurality of different components. Each group corresponds to a task, set of tasks or topic of information related to a user's role. The particular components included in each group are user interface display elements that are each related to an item of content within the corresponding group. The workspace display has filter mechanisms that are actuated to filter the content displayed in the components on the workspace display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3B-3G are illustrative user interface displays.

DETAILED DESCRIPTION

Figure 1:
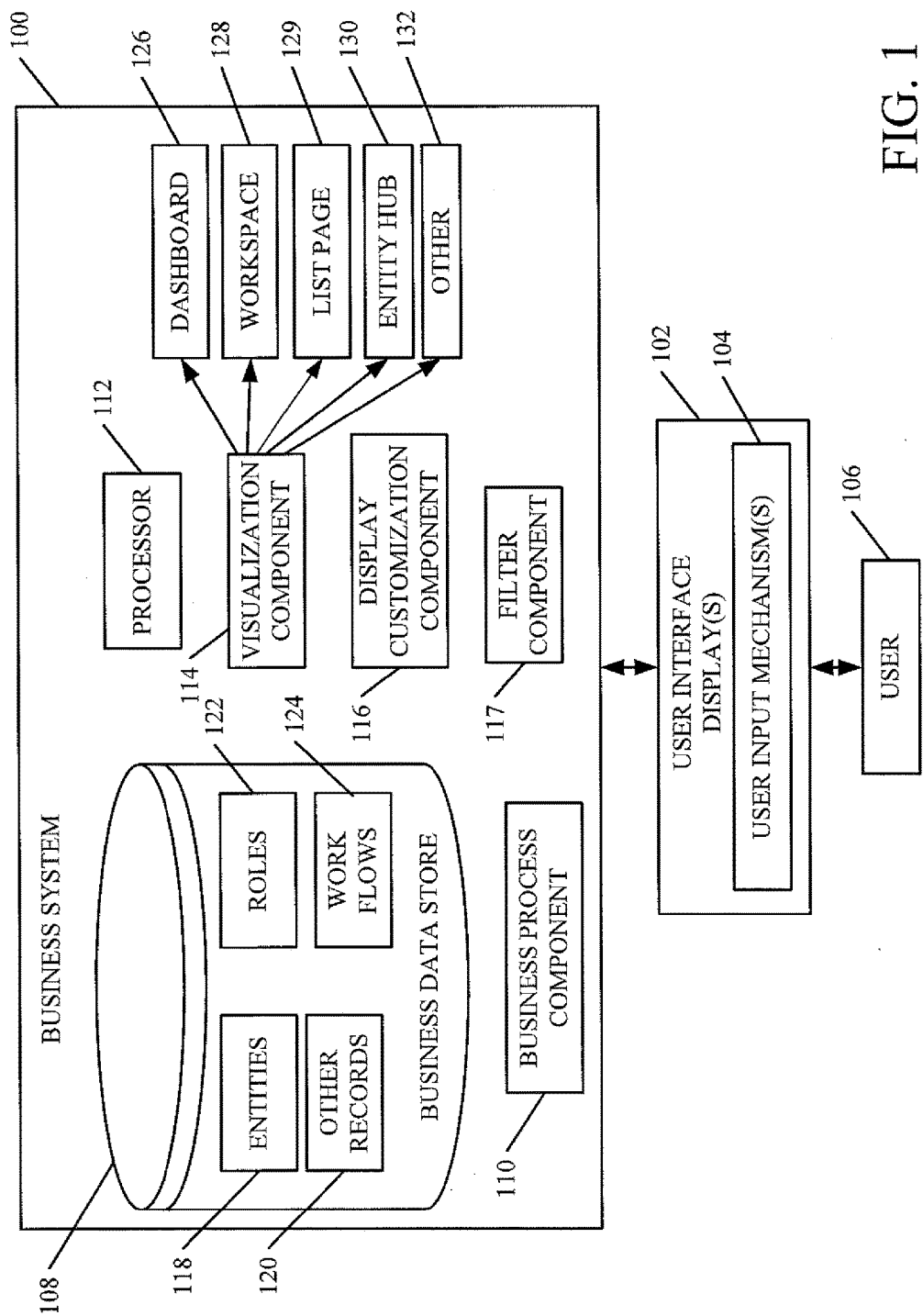
FIG. 1 is a block diagram of one illustrative business system.

FIG. 1 is a block diagram of one embodiment of business system 100. Business system 100 generates user interface displays 102 with user input mechanisms 104 for interaction by user 106. User 106 illustratively interacts with the user input mechanisms 104 to control and manipulate business system 100.

Business system 100 illustratively includes business data store 108, business process component 110, processor 112, visualization component 114, display customization component 116 and filter component 117. Business data store 108 illustratively includes business data for business system 100. The business data can include entities 118 or other types of business records 120. It also includes a set of roles 122 that can be held by various users of the business data system 100. Further, business data store 108 illustratively includes various workflows 124. Business process component 110 illustratively executes the workflows 124 on entities 118 or other business data records 120, based on user inputs from users that each have one or more given roles 122.

Visualization component 114 illustratively generates various visualizations, or views, of the data and processes (or workflows) stored in business data store 108. The visualizations can include, for example, one or more dashboard displays 126, a plurality of different workspace displays 128, a plurality of different list page displays 129, a plurality of different entity hub displays 130, and other displays 132.

Dashboard display 126 is illustratively an overview of the various data and workflows in business system 100. It illustratively provides a plurality of different links to different places within the application comprising business system 100.

Workspace display 128 is illustratively a customizable, activity-oriented display that provides user 106 with visibility into the different work (tasks, activities, data, etc.) performed by user 106 in executing his or her job. The workspace display 128 illustratively consolidates information from several different areas in business system 100 (e.g., in a business application that executes the functionality of business system 100) and presents it in an organized way for visualization by user 106.

List page display 129 is illustratively a page that breaks related items out into their individual rows. The other displays 126, 128, and 130 illustratively have user actuatable links that can summarize related information, but actuated to navigate the user to a list page display 129 that has the related information broken out. For example, whereas a workspace display 128 might have an individual element (such as a tile or a list or a chart, etc.) that summarizes the related information, the corresponding list page display 129 will break the summarized information into their individual rows. A workspace display 128 can also have multiple elements that each point to a different list page display 129.

Entity hub display 130 is illustratively a display that shows a great deal of information about a single data record (such as a single entity 118 or other data record 120, which may be a vendor record, a customer record, an employee record, etc.). The entity hub display 130 illustratively includes a plurality of different sections of information, with each section designed to present its information in a given way (such as a data field, a list, etc.) given the different types of information.

Business process component 110 illustratively accesses and facilitates the functionality of the various workflows 124 that are preformed in business system 100. It can access the various data (such as entities 118 and business records 120) stored in data store 108, in facilitating this functionality as well.

Display customization component 116 illustratively allows user 106 to customize the displays that user 106 has access to in business system 100. For instance, display customization component 116 can provide functionality that allows user 106 to customize one or more of the workspace displays 128 that user 106 has access to in system 100.

Filter component 117 receives user filter inputs (indicative of filter criteria) and filters data displayed on displays 126, 128, 129, 130 and 132 based on those inputs. For instance, display 128 can have filter user input mechanisms displayed thereon. When user 106 actuates one of the filter user input mechanisms, filter component 117 filters the data used by visualization component 114 to generate workspace display 128. This is described in greater detail below with respect to FIGS. 5-5B.

Processor 112 is illustratively a computer processor with associated memory and timing circuitry (not separately shown). It is illustratively a functional part of business system 100 and is activated by, and facilitates the functionality of, other components or items in business system 100.

Data store 108 is shown as a single data store, and is local to system 100. It should be noted, however, that it can be multiple different data stores as well. Also, one or more data stores can be remote from system 100, or local to system 100, or some can be local while others are remote.

User input mechanisms 104 can take a wide variety of different forms. For instance, they can be text boxes, active tiles, check boxes, icons, links, dropdown menus, or other input mechanisms. In addition, they can be actuated by user 106 in a variety of different ways as well. For instance, they can be actuated using a point and click device (such as a mouse or trackball) using a soft or hard keyboard, a thumbpad, a keypad, various buttons, a joystick, etc. In addition, where the device on which user interface displays are displayed has a touch sensitive screen, they can be actuated using touch gestures (such as with a user's finger, a stylus, etc.). Further, where the device or system includes speech recognition components, they can be actuated using voice commands.

It will also be noted that multiple blocks are shown in FIG. 1, each corresponding to a portion of a given component or functionality performed in system 100. The functionality can be divided into additional blocks or consolidated into fewer blocks. All of these arrangements are contemplated herein.

In one embodiment, each user 106 is assigned a role 122, based upon the types of activities or tasks that the given user 106 will perform in business system 100. Thus, in one embodiment, workspace display 128 is generated to provide information related to the role of a given user 106. That is, user 106 is provided with different information on a corresponding workspace display 128, based upon the particular role or roles that are assigned to user 106 in business system 100. In this way, user 106 is presented with a visualization of information that is highly relevant to the job being performed by user 106 in business system 100.

In addition, some types of roles 122 may have multiple corresponding workspace displays 128 generated for them. By way of example, assume that user 106 is assigned an administrator's role in business system 100. In that case, user 106 may be provided with access to multiple different workspace displays 128. A first workspace display 128 may be a security workspace. The security workspace may include information related to security features of business system 100, such as access, permissions granted in system 100, security violations in system 100, authentication issues related to system 100, etc. User 106 (being in an administrative role) may also have access to a workspace display 128 corresponding to the health of system 100. This workspace display 128 may include information related to the performance of system 100, the memory usage and speed of system 100, etc. Thus, a given user 106 that has only a single role 122 may have access to multiple different workspace displays 128.

Similarly, a given user 106 may have multiple different roles 122. By way of example, assume that a given user 106 is responsible for both the human resources tasks related to business system 100, and payroll tasks. In that case, the given user 106 may have a human resources role 122 and a payroll role 122. Thus, user 106 may have access to one or more workspace displays 128 for each role 122 assigned to user 106 in business system 100. In this way, when user 106 is performing the human resources tasks, user 106 can access the human resources workspace display 128 which will contain all of the information user 106 believes is relevant to the human resources role and the human resources tasks. Then, when user 106 is performing the payroll tasks in system 100, user 106 can access one or more payroll workspace displays 128 which contain the information relevant to the payroll tasks and role. In this way, the user need not have just a single display with all of the information related to both the payroll tasks and the human resources tasks on a single display, which can be confusing and cumbersome to work with.

Figure 2:
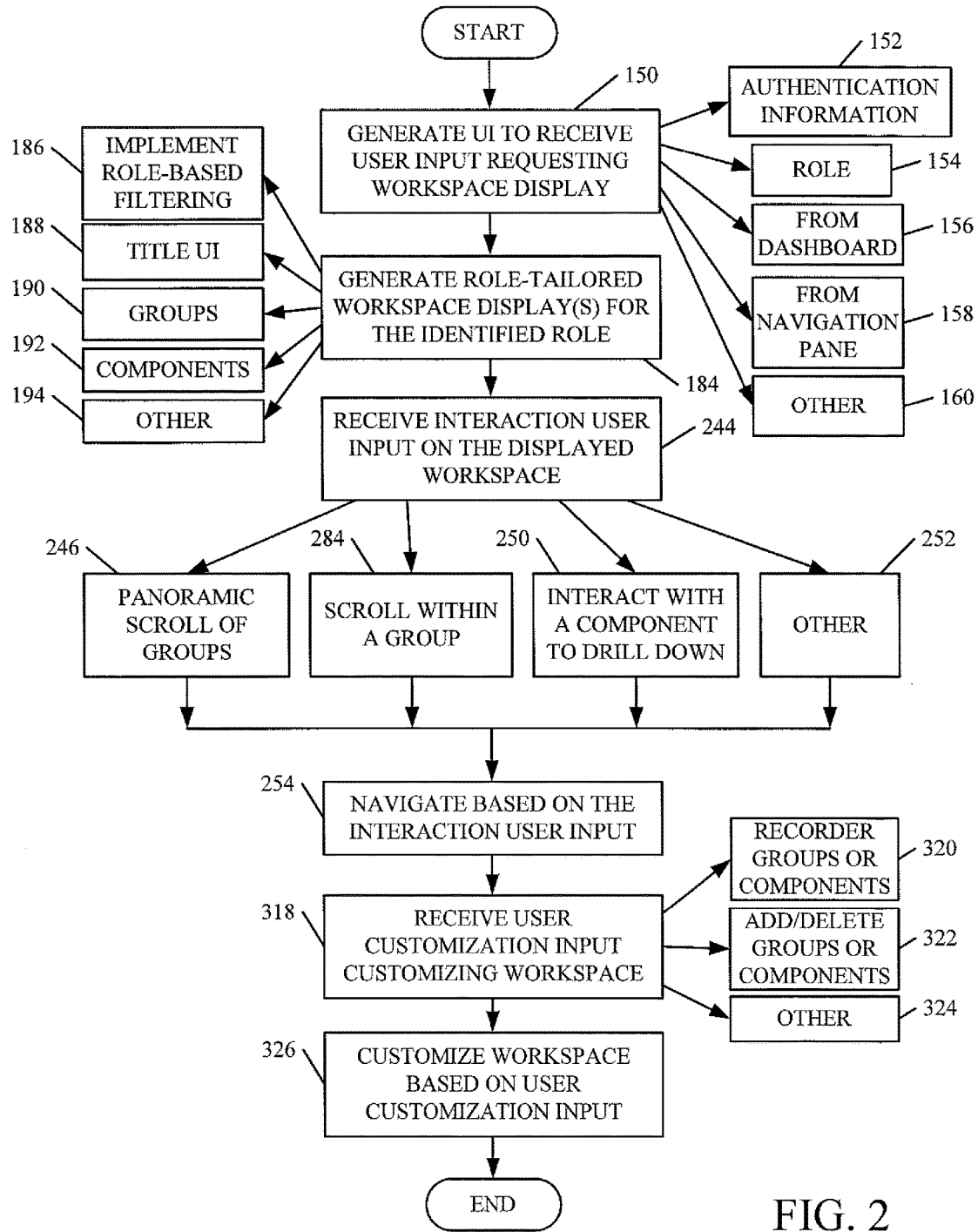
FIG. 2 is a flow diagram illustrating one embodiment of the overall operation of the system shown in FIG. 1, in generating and manipulating a workspace display.

FIG. 2 is a flow diagram illustrating one embodiment of the operation of system 100 in generating and manipulating various workspace displays 128. Visualization component 114 first generates a user interface display that allows a user to log into business system 100 (or otherwise access business system 100) and request access to a workspace display for one or more workspaces corresponding to the role or roles assigned to user 106. Generating the UI display to receive a user input requesting a workspace display is indicated by block 150 in FIG. 2.

This can include a wide variety of different things. For instance, user 106 can provide authentication information 152 (such as a user name and password), or a role 154 (or the role can be automatically accessed within system 100 once the user provides authentication information 152). In addition, if user 106 has already logged into (or otherwise accessed) business system 100, the user 106 may be viewing a dashboard display 126 and the user can access his or her workspace from the dashboard display, as indicated by block 156 in FIG. 2. User 106 can also illustratively access a workspace display 128 from a navigation pane that is displayed by visualization component 114. This is indicated by block 158. Of course, the user 106 can navigate to, or request access to, a workspace display 128 in other ways as well, and this is indicated by block 160.

Figure 2A:
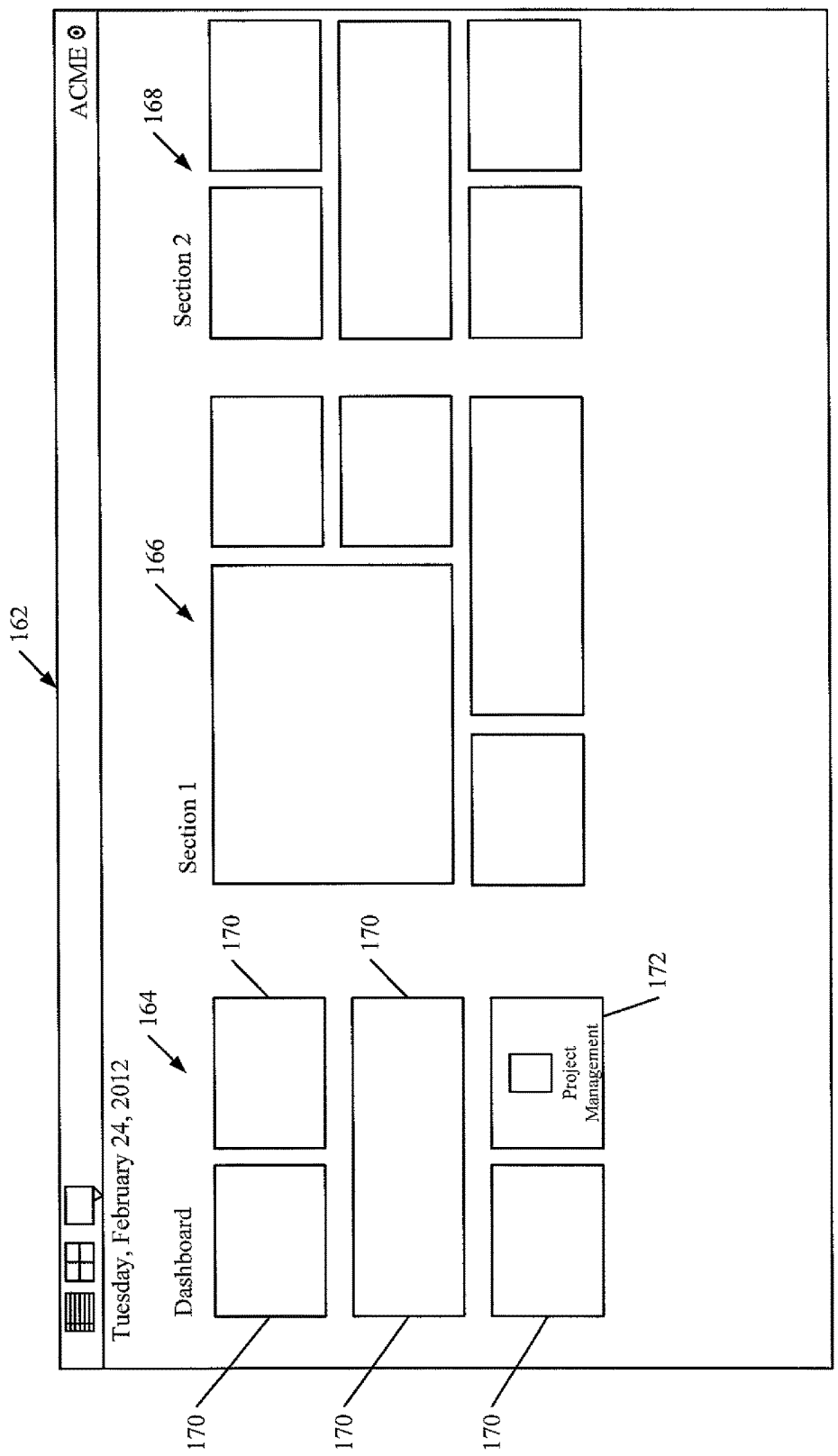
FIGS. 2A-2C are illustrative user interface displays illustrating different ways of navigating to a workspace display.

FIG. 2A shows one illustrative user interface display 162 illustrating a dashboard display 164, with a plurality of other display sections 166 and 168. Dashboard display 164 illustratively includes a plurality of user interface components 170 as well as a project management workspace selection component 172. In the present embodiment, it is assumed that user 106 has the role of a project manager. Therefore, the workspace display 128 corresponding to that role may be entitled "Project Management" (or another title) and represented by component 172. When the user actuates component 172, the user is illustratively navigated to the project management workspace display 128 for this particular user 106.

It will also be noted, that in one embodiment, components 170 and 172 are dynamic tiles. The dynamic tiles each correspond to one or more items of data, views, activities, tasks, etc. in business system 100. They also each have a display element that is dynamic. That is, the display element is updated based upon changes to the underlying data or other item which the component 170 or 172 represents. If the user actuates tile 172, the user is illustratively navigated to the corresponding workspace display 128. Also, if this particular user 106 has a role that has multiple workspaces, or if this particular user 106 has multiple roles, then dashboard display 164 illustratively includes a tile for each of the user's workspace displays 128.

Figure 2B:
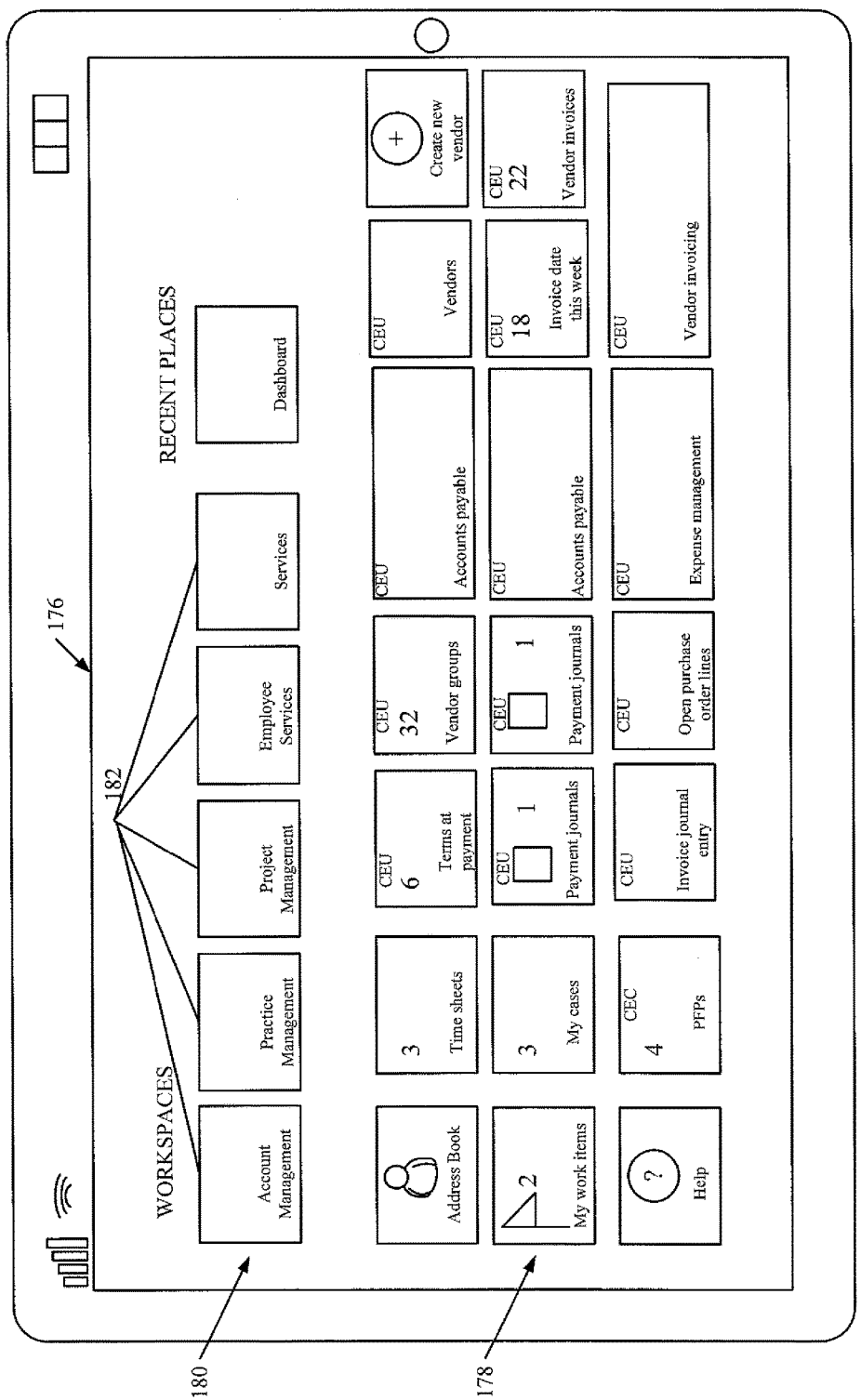

FIG. 2B shows one embodiment of another user interface display 176. User interface display 176 illustratively includes a set of controls (or tiles) 178 that allow user 106 to navigate to associated entities and views of entities, or to other areas within business system 100. User interface display 176 also illustratively includes a workspace display list (or workspace navigation pane) 180, which includes a control 182 corresponding to each one of the workspace displays 128 to which user 106 has access, given the user's role or roles. Actuating one of the controls 182 illustratively navigates user 106 to the corresponding workspace display. Only workspace displays that are directly associated with the role of user 106 are displayed in the workspace navigation pane 180 of user interface display 176. For example, if the particular role associated with user 106 has two different workspace displays, then controls 182 are only provided to navigate the user to those workspace displays. In addition, if user 106 has multiple roles, then a set of controls 182 will be provided to navigate the user to the workspace displays associated with the user's multiple roles. In any case, user interface display 176 illustratively provides controls 182 that allow the user to navigate to only those workspace displays 128 to which the user 106 has access.

Figure 2C:
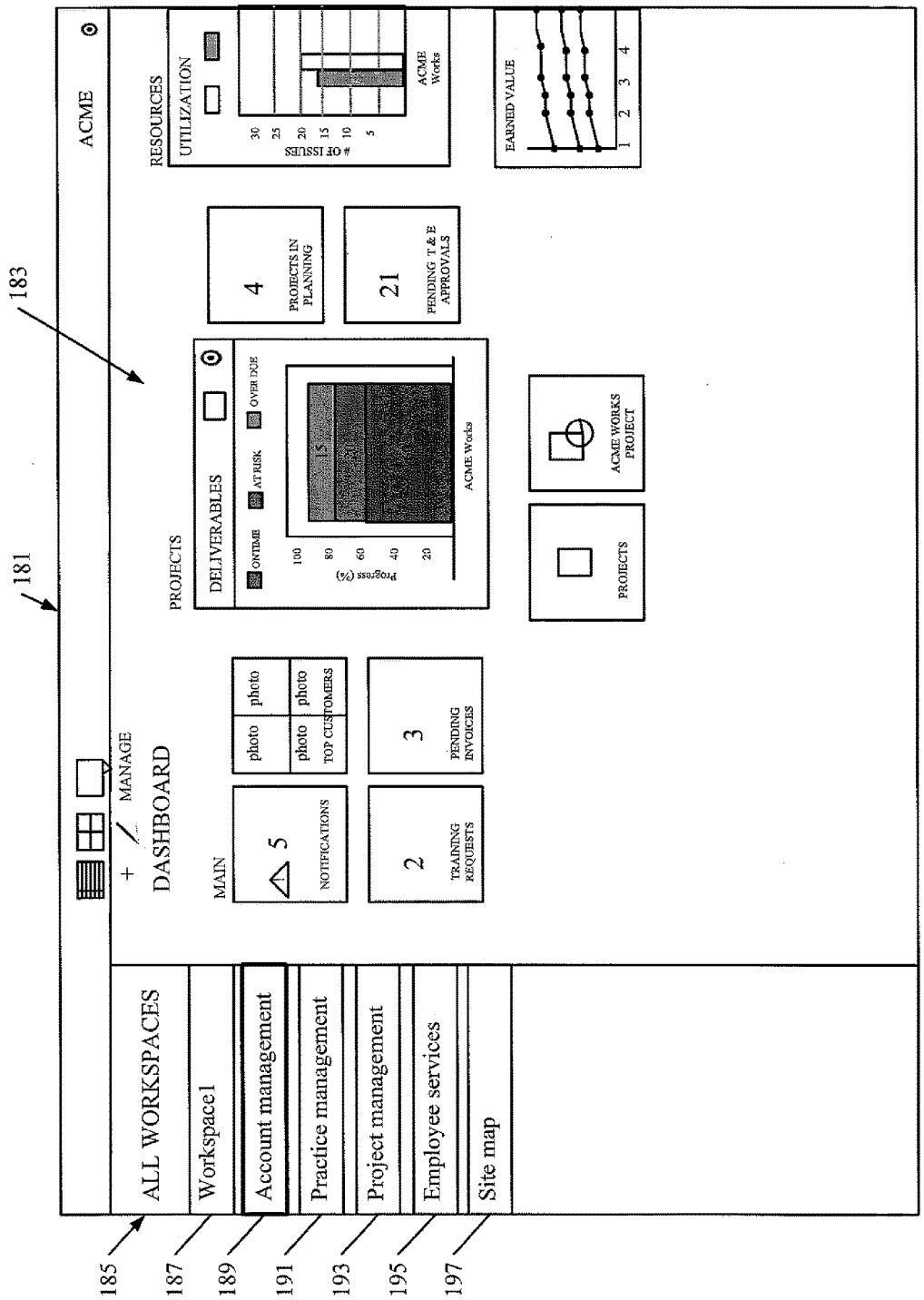

FIG. 2C shows one embodiment of another user interface display 181. User interface display 181 illustratively includes a dashboard display section 183 and a workspace navigation pane 185. Workspace navigation pane 185 is similar, in some ways, to workspace navigation pane 180 shown in FIG. 2B. However, instead of being displayed at the top of the user interface display, it is displayed on the side. In addition, workspace navigation pane 185 has a plurality of user actuatable links 187, 189, 191, 193, 195 and 197. Each of the user actuatable links 187-197 when actuated by user 106, navigates user 106 to a different screen. Elements 187-195 navigate user 106 to a corresponding workspace display 128, while element 197 navigates user 106 to a site map display.

In one embodiment, elements 187-197 are arranged on workspace navigation pane 185 in a hierarchical way. For instance, the workspace displays that user 106 most frequently accesses can have the corresponding elements 187-197 higher up in the list of elements 187-197 shown on workspace navigation pane 185. Of course, the hierarchy can be determined in other ways (other than frequency of use) as well. It can be seen in FIG. 2C that the elements 187-195, which navigate user 106 to a workspace display, are placed higher (e.g., they are arranged as the primary navigation mechanisms) in the hierarchy on workspace navigation pane 185, and the site map element 197 is placed lower (it is a secondary navigation mechanism) in the hierarchy. This hierarchy is provided by way of example only, and other user actuatable elements can be provided, they can be arranged according to a different hierarchy, or the hierarchy can be determined using different criteria. All of these are contemplated herein.

It should also be noted that, in FIGS. 2B and 2C, the workspace navigation panes 180 and 185 need not be always visible. Instead, they can be hidden and invoked by the user 106 providing a suitable user input. For instance, where the display screen is a touch sensitive screen, the user can illustratively use a swipe gesture to slide the workspace navigation pane 180 in from the top of the display, or to slide the workspace navigation pane 185 in from the left side of the display. These are given by way of example, and other mechanisms for invoking a workspace navigation pane can be used as well.

Once the user provides a suitable user input to request the display of a workspace display 128, visualization component 114 illustratively generates one or more role-tailored workspace displays corresponding to the role or roles assigned to user 106 and corresponding to the particular workspace display 128 that the user has requested. This is indicated by block 184 in FIG. 2. The workspace display is a tailored view of workspace components grouped by the activities a role performs. Each type of activity, and the components related to the activity, are grouped in the workspace into groups. The workspace displays can be generated by implementing role-based filtering 186 so that only information corresponding to the specific role is displayed on the workspace display. Of course, this can be calculated ahead of time as well so the information need not be filtered on-the-fly.

The workspace displays can comprise a tiled user interface display indicated by block 188, and it is illustratively arranged with groups 190 of components 192. This is described in greater detail below with respect to FIGS. 3-3G. The workspace displays 128 can also include other information, as indicated by block 194.

Figure 3:
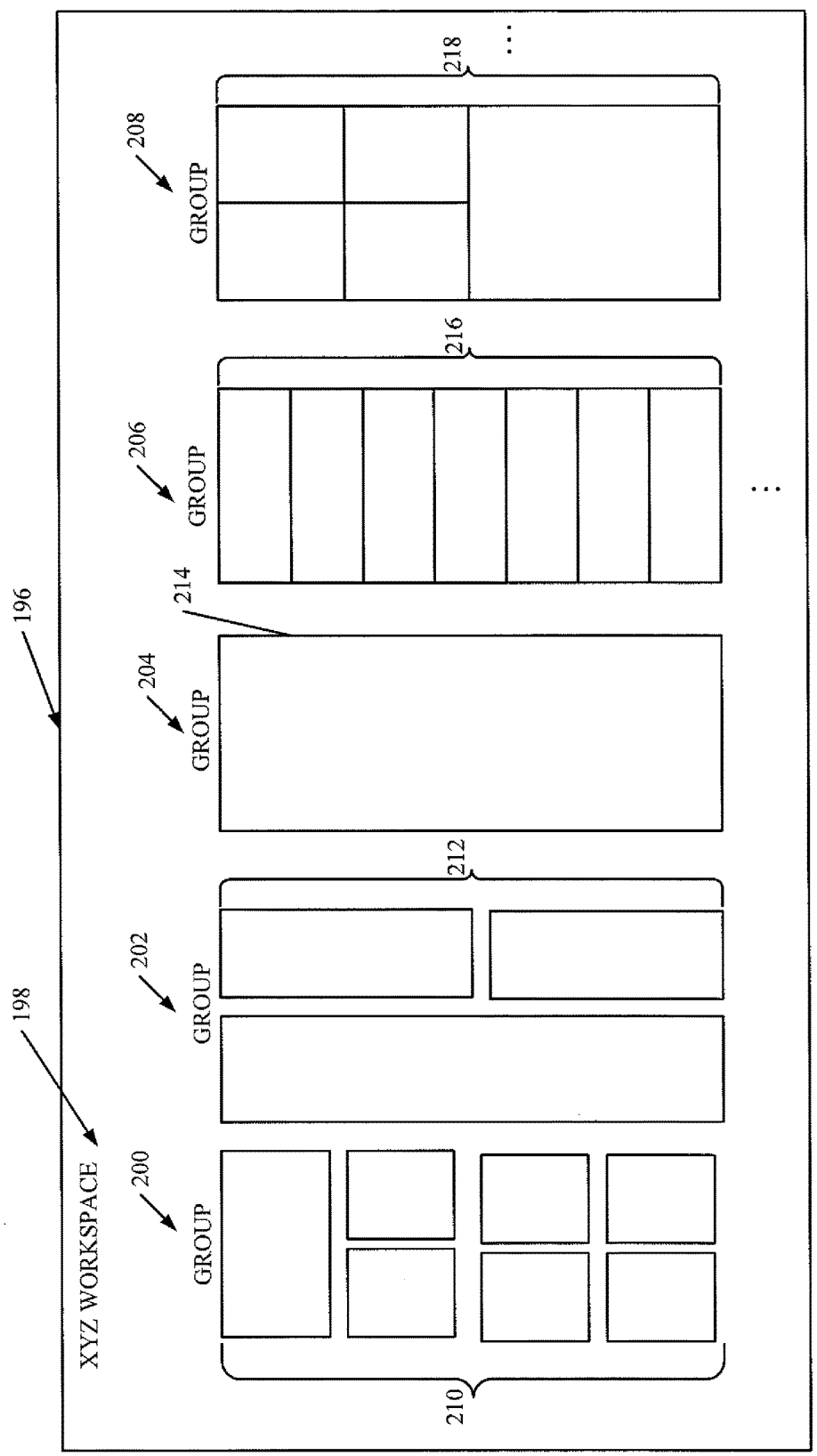
FIG. 3—is a block diagram of one illustrative workspace display.

FIG. 3 shows one block diagram of an illustrative user interface workspace display 196. The workspace display 196 includes a title portion 198 that shows a title of the workspace. In one embodiment, the title is related to the role of the given user. For instance, if the user is an account manager, then the title portion 198 might be "account management workspace", or some other title related to the role of user 106. Of course, this is optional.

Workspace display 196 illustratively includes a plurality of groups 200, 202, 204, 206 and 208, and each group has one or more components 210, 212, 214, 216 and 218. Each group 200-208 illustratively corresponds to a topic area or subject matter area, or a set of activities or tasks, related to the role assigned to user 106. For example, group 200 may be a "related information" group that shows a collection of tiles that provide quick access to entities frequently used by the user or related to the tasks preformed by the role assigned to user 106. Group 202 may be a "what's new" group which displays update information corresponding to activities of others in the account management area. Group 204 may illustratively be a "projects" group that shows charts and graphs and other information related to the various projects that user 106 is managing. Group 206 may illustratively be an upcoming deliverables group that shows upcoming deliverables for the accounts being managed by user 106. Of course, these are exemplary groups and they can be related to substantially any topic area, task or activity associated with the role assigned to user 106. Each of the components 210-218 illustratively correspond to an item of data or to a task or activity that is related to the role assigned to user 106.

Figure 3A:
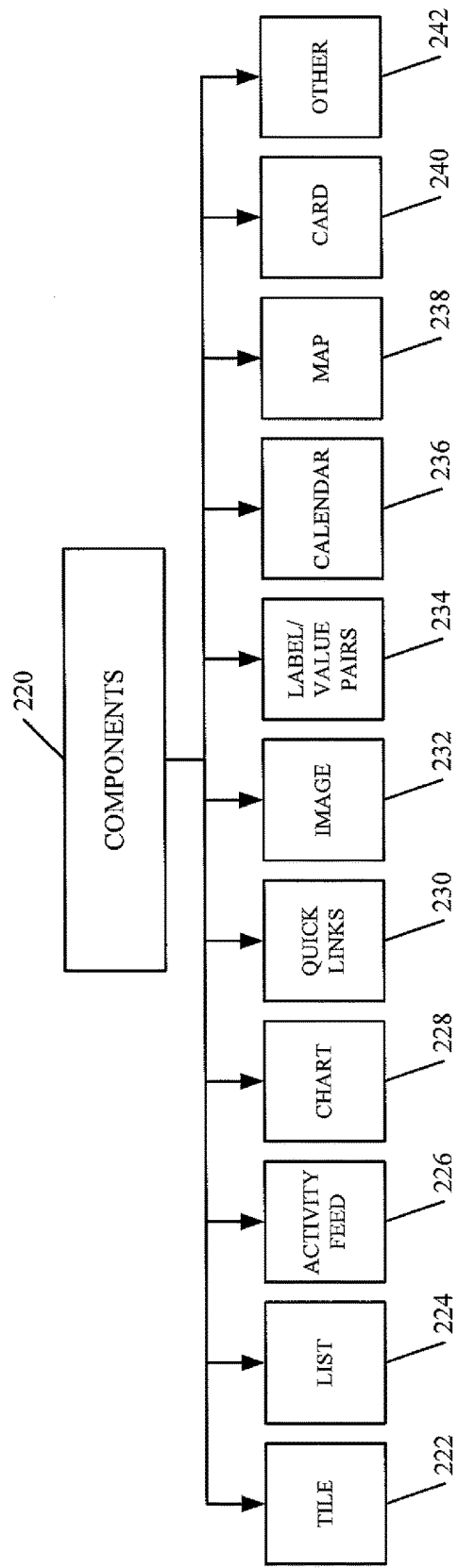
FIG. 3A is a block diagram showing various components that can be included on a workspace display.

FIG. 3A is a block diagram showing one embodiment of examples of different components 220. FIG. 3A shows that any given component 220 can be a tile 222, a list 224, an activity feed 226, a chart 228, one or more quick links 230, an image 232, label/value pairs 234, a calendar 236, a map 238, a card 240, or another user interface element 242.

Once a workspace display (such as display 196 shown in FIG. 3) is displayed for user 106, user 106 can illustratively interact with the display (by providing a user interaction input) to see different or more detailed information, or to navigate to other displays. Receiving a user interaction input on the workspace display is indicated by block 244 in FIG. 2. A number of examples of user interaction inputs will now be described.

In one embodiment, the workspace display is a panoramic display. That is, if there is more information in the workspace display than can be displayed on a single screen, the screen can be panned to the left or to the right in order to expose and display the additional information. For example, if the workspace display is displayed on a touch sensitive screen, the user can simply pan the display to the left or to the right using a swipe touch gesture. In this way, the user can scroll horizontally (or panoramically) to view all of the various groups on the workspace display. Receiving a panoramic scroll input, to scroll panoramically through the groups in a workspace display, is indicated by block 246 in FIG. 2.

In one embodiment, the components in each group can be scrolled vertically as well. For instance, and referring again to FIG. 3, if the list of components 216 in group 206 exceeds the space available to it, the user can illustratively scroll the list vertically (independently of the other groups) to expose and display additional components in the group. Scrolling within a group is indicated by block 248 in FIG. 2.

Further, the user can interact with the workspace display by actuating one of the components in one of the groups. When the user does this, the user is illustratively navigated (i.e., the user drills down) to a display that shows more detailed information represented by that particular component. Interacting with a component to drill down to more detailed information is indicated by block 250 in FIG. 2.

Of course, the user can interact with the workspace display in other ways as well. This is indicated by block 252.

Once the user interaction input is received on the workspace display, visualization component 114 navigates the user, or reacts in another desired way, based upon the interaction user input. This is indicated by block 254 in FIG. 2.

Figure 3B:
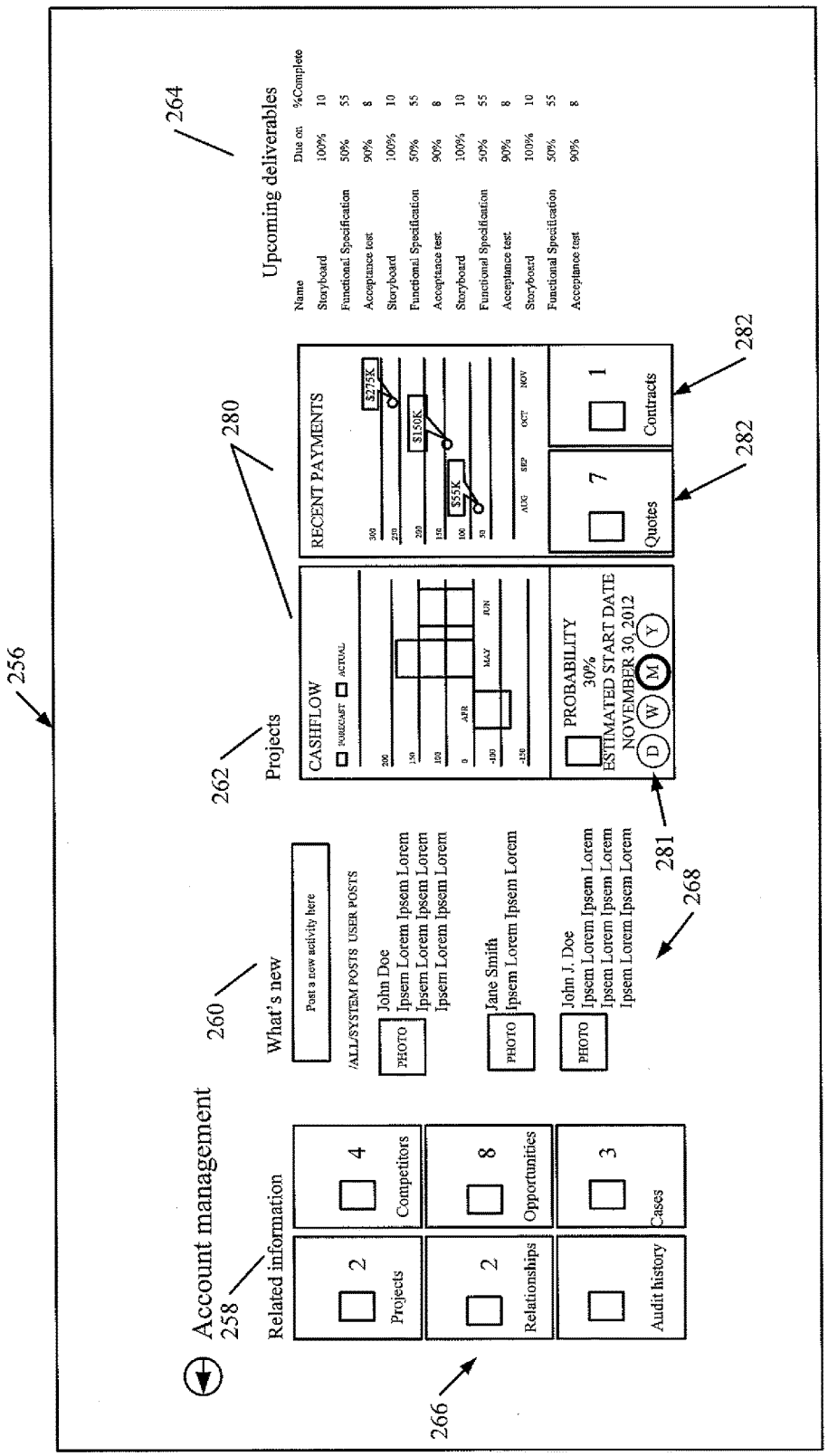

FIG. 3B shows one embodiment of a workspace display 256. It can be seen that workspace display 256 includes a related information group 258, a what's new group 260, a projects group 262, and an upcoming deliverables group 264. Of course, the workspace display 256 can include additional groups that the user can pan to using a panoramic navigation input to move the display to the right or to the left, on the display screen.

It can be seen that each of the groups 258-264 includes a set of components. Group 258 includes tiles 266 that, when actuated by the user, navigate the user to an underlying entity represented by the specific tile. Each tile 266 is illustratively a single click or touch target. The tile surface is dynamic and may be frequently updated with new content from the underlying entity. Tiles 266 allow users to navigate to an application context which may be an entity, a list of entities, another workspace, a form, or a task, etc. These are listed by way of example only.

Figure 3C:
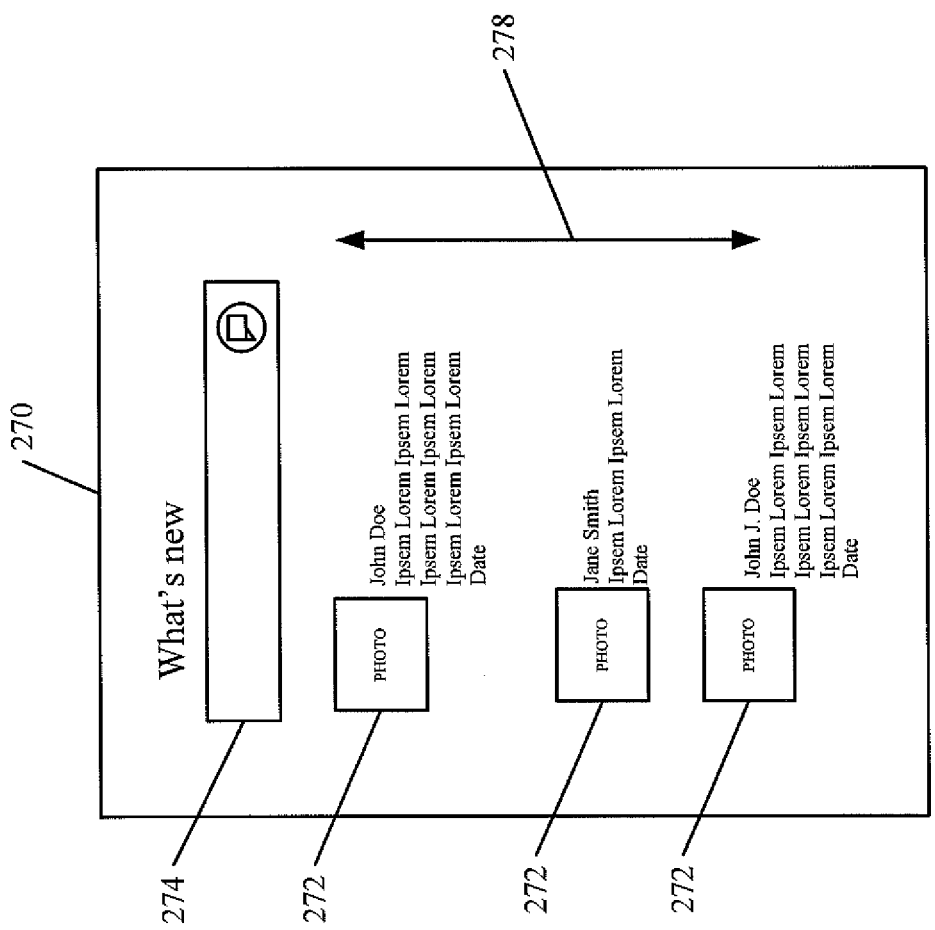
Figure 3D:
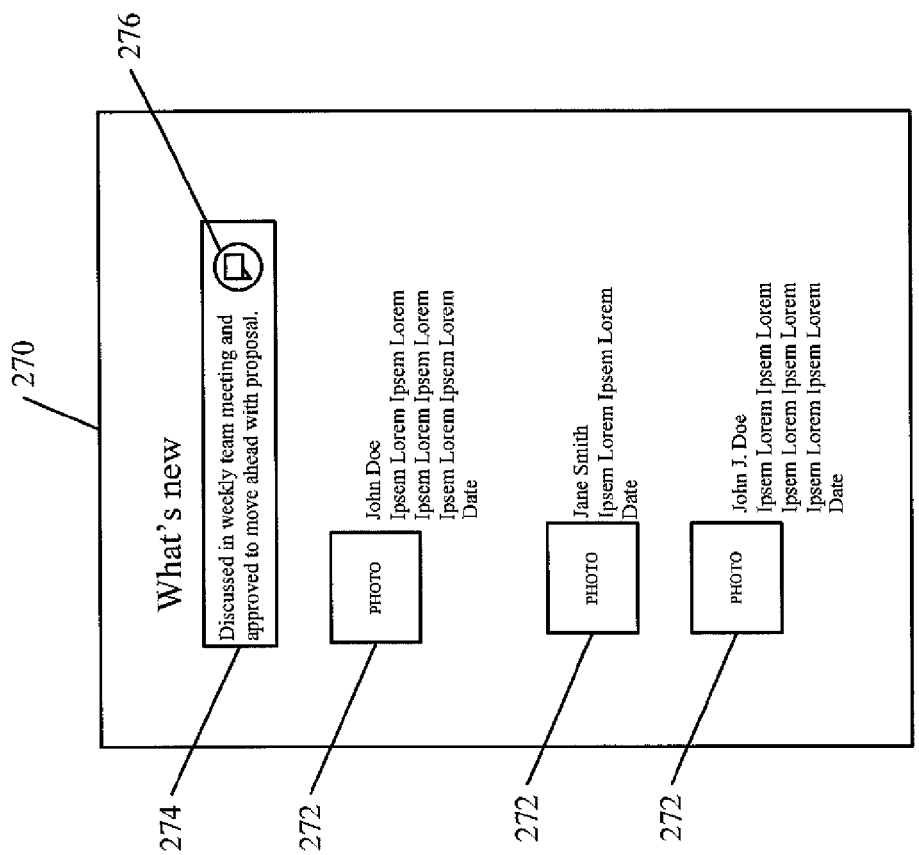

The what's new group 260 includes an activity feed 268. An activity feed displays a continuous flow of collaboration and activity related information. It can help users to obtain visibility into the work, projects, tasks and assignments that are most important to them. In providing an interaction user input to an activity feed 268, a user can illustratively post, filter or add a comment to the activity feed from the workspace display. FIGS. 3C and 3D are portions of a user interface display that illustrate this.

FIG. 3C shows one embodiment of a display of an activity feed 270 with collaboration and activity related information in the form of a plurality of items 272. It also illustratively includes a text box 274 that can receive a textual user posting (or textual entry) from user 106. FIG. 3D shows display 270, with a textual entry typed into text box 274. When the user actuates post button 276, the textual entry is posted to the list of items 272 in the activity feed for review by others who receive the activity feed. Post button 276 is optional and the textual entry can be posted in other ways as well. It will also be noted that, if the number of items 272 in the activity feed exceed the vertical workspace available for displaying them, then the user 106 can illustratively scroll vertically (independently of the other groups) in the directions indicated by arrow 278. This can be done using an appropriate user input, such as touch gesture, a point and click input, etc.

Referring again to FIG. 3B, group 262 includes a mixed set of components. Group 262 includes a plurality of charts 280 with configuration buttons 281, along with a plurality of tiles 282. Therefore, user 106 can interact with the components of group 262 in a variety of different ways. Interactions with tiles 282 has already been discussed above with respect to group 258. In order to interact with a chart 280, the user can illustratively interact with various parts of a chart. For example, the user 106 can quickly modify the configuration of the chart by actuating one of the configuration buttons 281. In the present example, buttons 281 can be actuated to vary the x-axis of the chart from days to weeks to months to years. Other buttons or user input mechanisms can be provided to modify the content of a group or component, from the workspace display, and buttons 281 are described for the sake of example only.

Figure 3E:
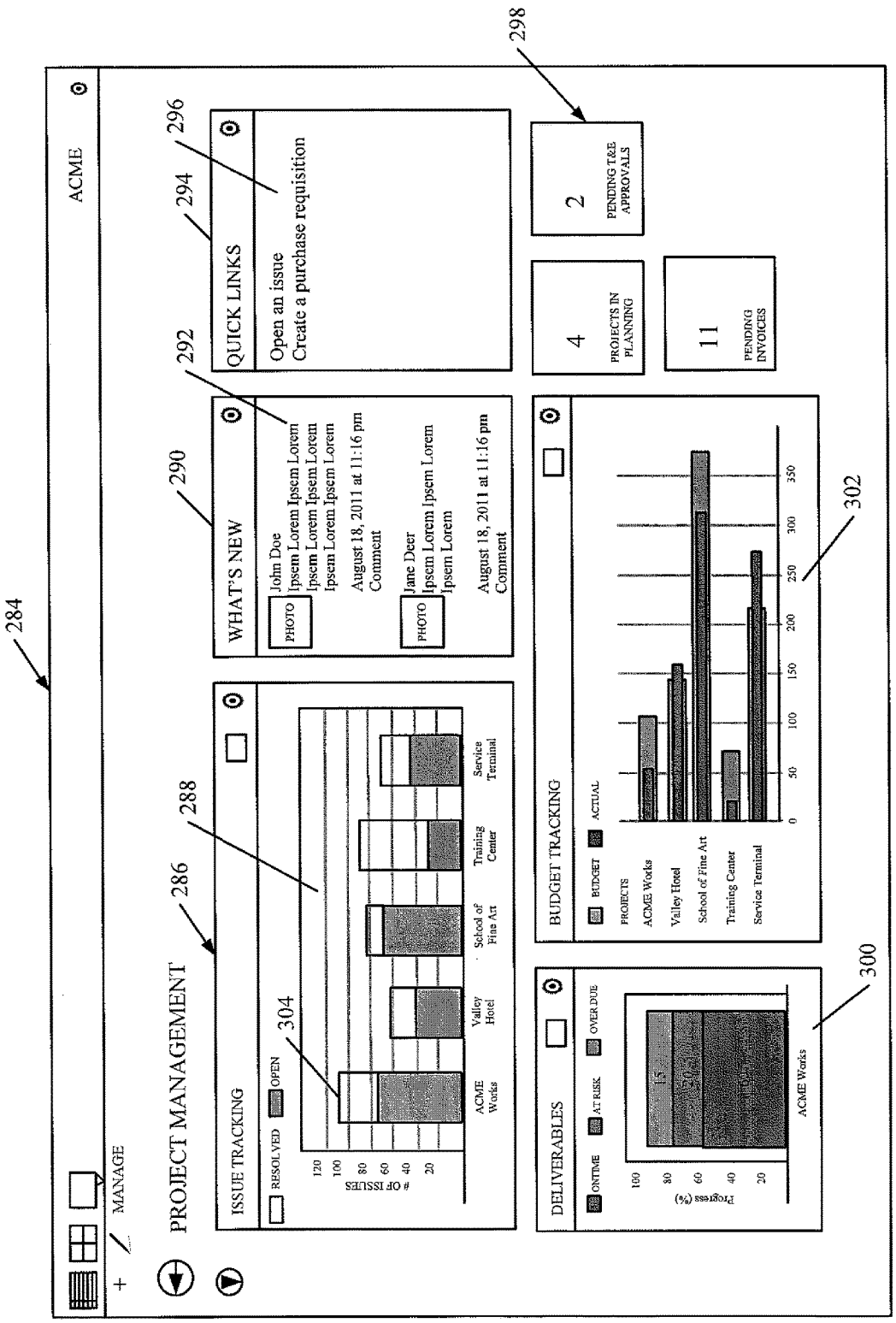

User 106 can also interact with the charts by clicking on one of the bars in one of charts 280. This causes visualization component 114 (in FIG. 1) to navigate the user to underlying information or data that supports that particular bar on that particular chart. FIG. 3E illustrates this.

FIG. 3E shows another user interface display 284 in which the groups are arranged differently. Instead of a single horizontal row of groups, the groups are arranged in both the horizontal direction and the vertical direction. The workspace illustratively includes an issue tracking group 286 represented by a chart component 288. It has a what's new group 290 represented by an activity feed component 292. It has a quick links group 294 represented by a set of links 296. It has a tiles group 298 represented by a plurality of tile components, and it also has a deliverables group 300 and a budget tracking group 302, each represented by a chart component. When the user interacts with chart 288 by clicking on the ACME works bar 304 in chart 288, this illustratively navigates the user to another display showing all the issues being tracked for the ACME works project. One such display is shown in FIG. 3F. FIG. 3F shows a user interface display 306 listing the issues being tracked for ACME. Similar navigation can be performed in response to the user actuating any of the other bars in chart 288 or in any of the other charts in the workspace display of user interface 284.

Figure 3G:
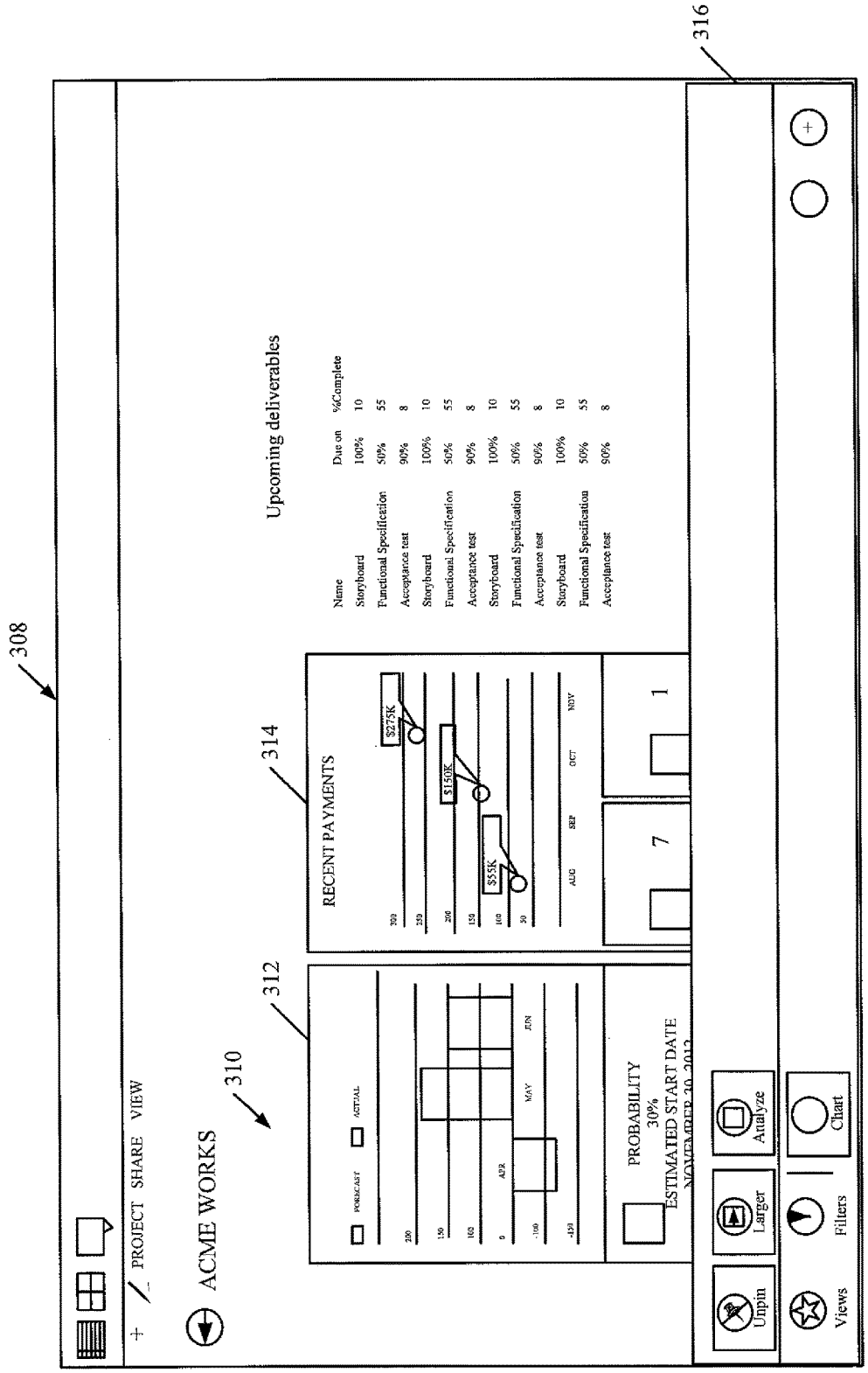

In another embodiment, in order to interact with a chart, the user can select an entire chart. FIG. 3G shows a user interface display 308 that has a projects group 310 with a plurality of chart components 312 and 314. The user has illustratively selected chart 314. This can be done by clicking on or tapping on the chart, by using another touch gesture or by right clicking or by using another point and click input, etc. In one embodiment, when chart 314 is selected, a command bar 316 is displayed that shows buttons corresponding to commands that apply to the selected chart component 314. Thus, user 106 can perform operations or interactions with chart component 314 using the buttons shown on command bar 316 as well.

The user can interact with other components in other groups in different ways as well. Those discussed above are discussed for the sake of example only.

The user can also illustratively customize the workspace display. For instance, continuing with reference to the flow diagram of FIG. 2, the user can provide a user input that indicates how the user wishes to customize the workspace display. Receiving such a user customization input is indicated by block 318 in FIG. 2. The customizations can include a wide variety of different kinds of customizations, such as reordering groups or components within the workspace display, as indicated by block 320, adding or deleting groups or components as indicated by block 322, or performing other customizations, as indicated by block 324.

To reorder groups or components, the user can illustratively perform a drag and drop operation in order to move a group or a component to a desired location. In that case, display customization component 116 (shown in FIG. 1) reflows the workspace display to order the groups and components as indicated by the user.

The user can add or delete groups or components relative to the workspace display in a variety of different ways. For instance, in one embodiment, when the user selects a group or a component, display customization component 116 displays a command bar with controls for removing the selected group or component. The user is also illustratively provided suitable user input mechanisms in order to add a group or component to the workspace display. This is described in greater detail below with respect to FIGS. 4-4D.

In any case, the user provides a customization input to customize the workspace display. Display customization component 116 (shown in FIG. 1) then customizes the workspace display based on the user customization input. This is indicated by block 326 in FIG. 2.

Figure 4:
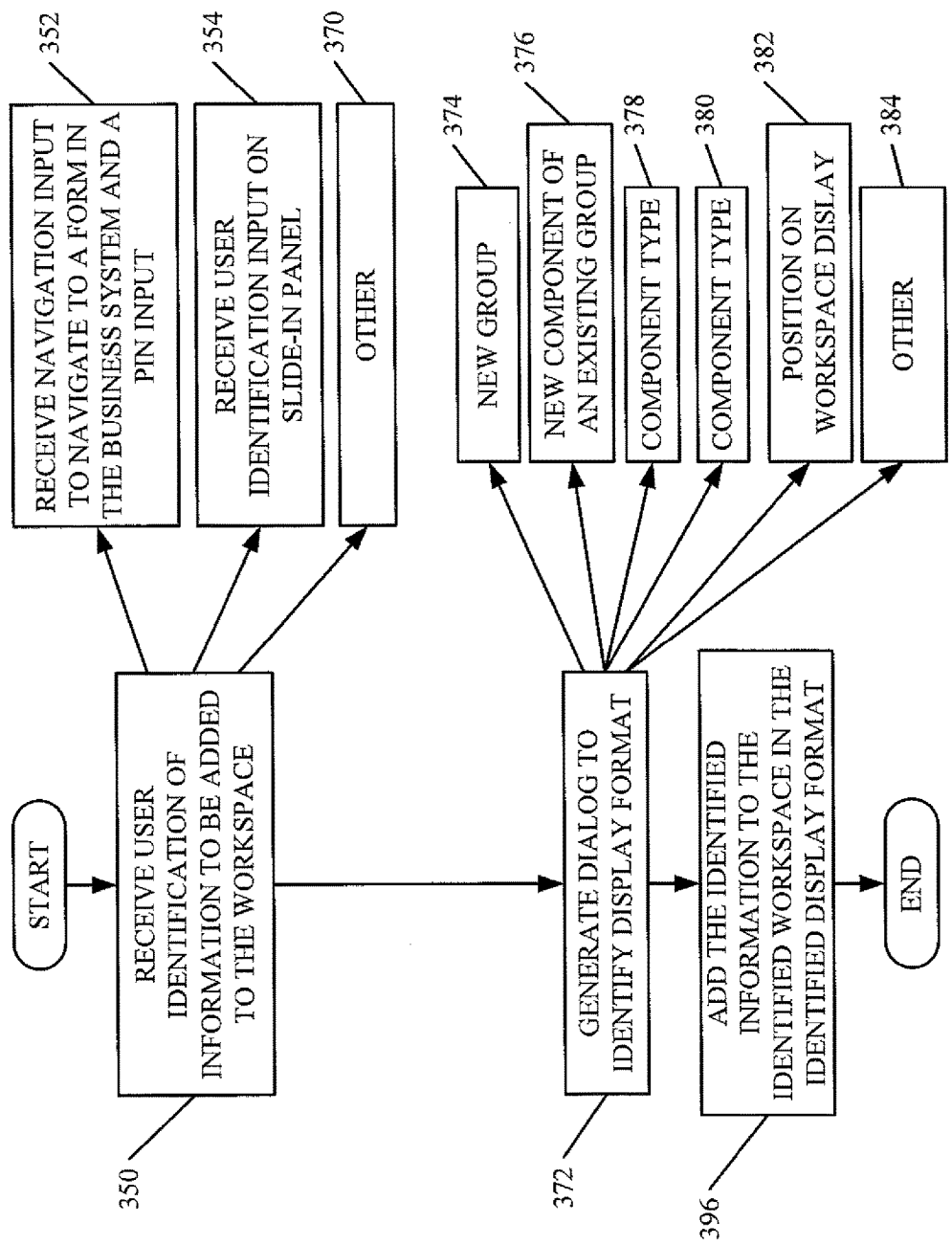
FIG. 4 is a flow diagram illustrating one illustrative embodiment of the operation of the system shown in FIG. 1 in adding a component or group to customize a workspace display.
Figure 4A:
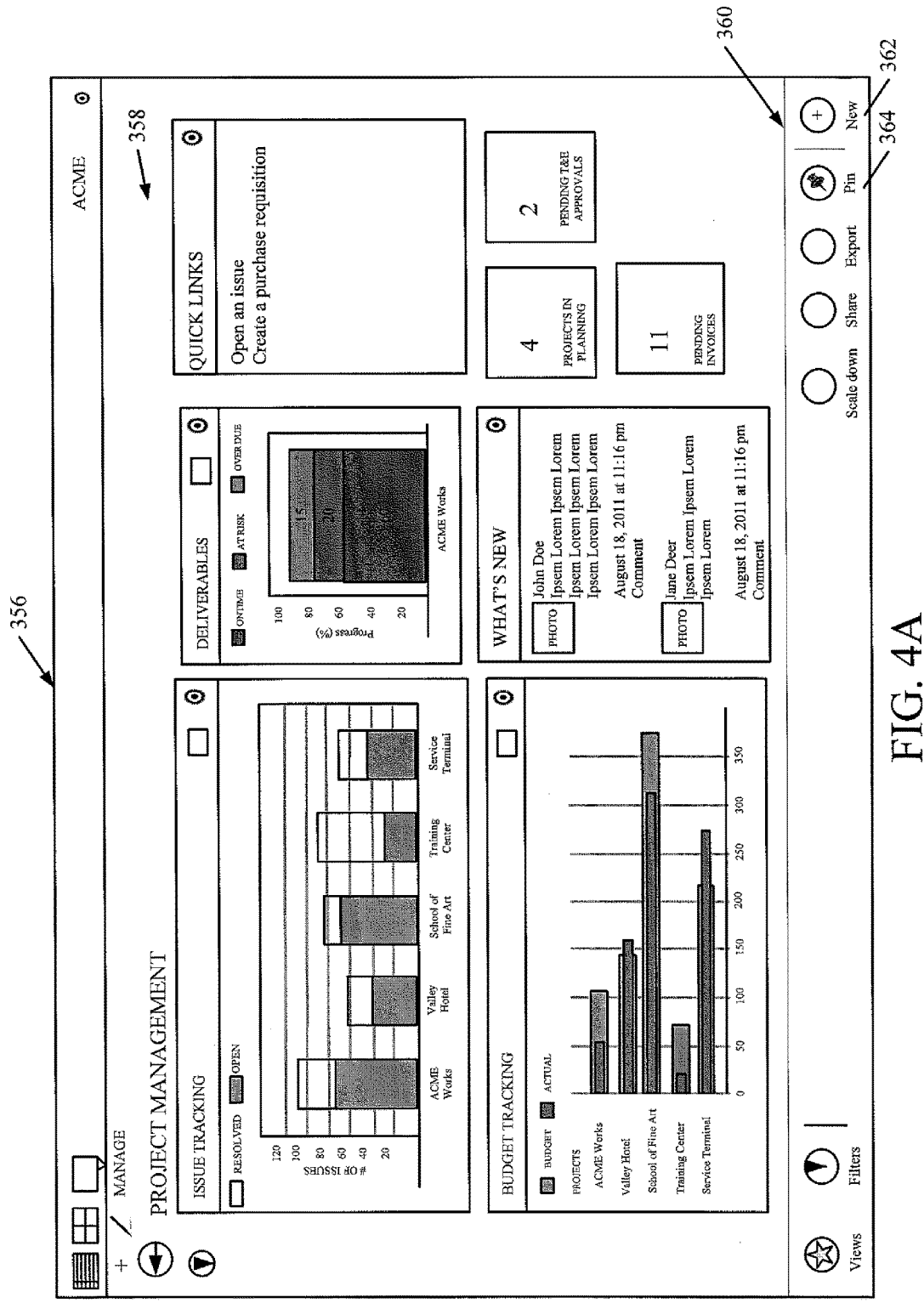
FIGS. 4A-4D are illustrative user interface displays.
Figure 4B:
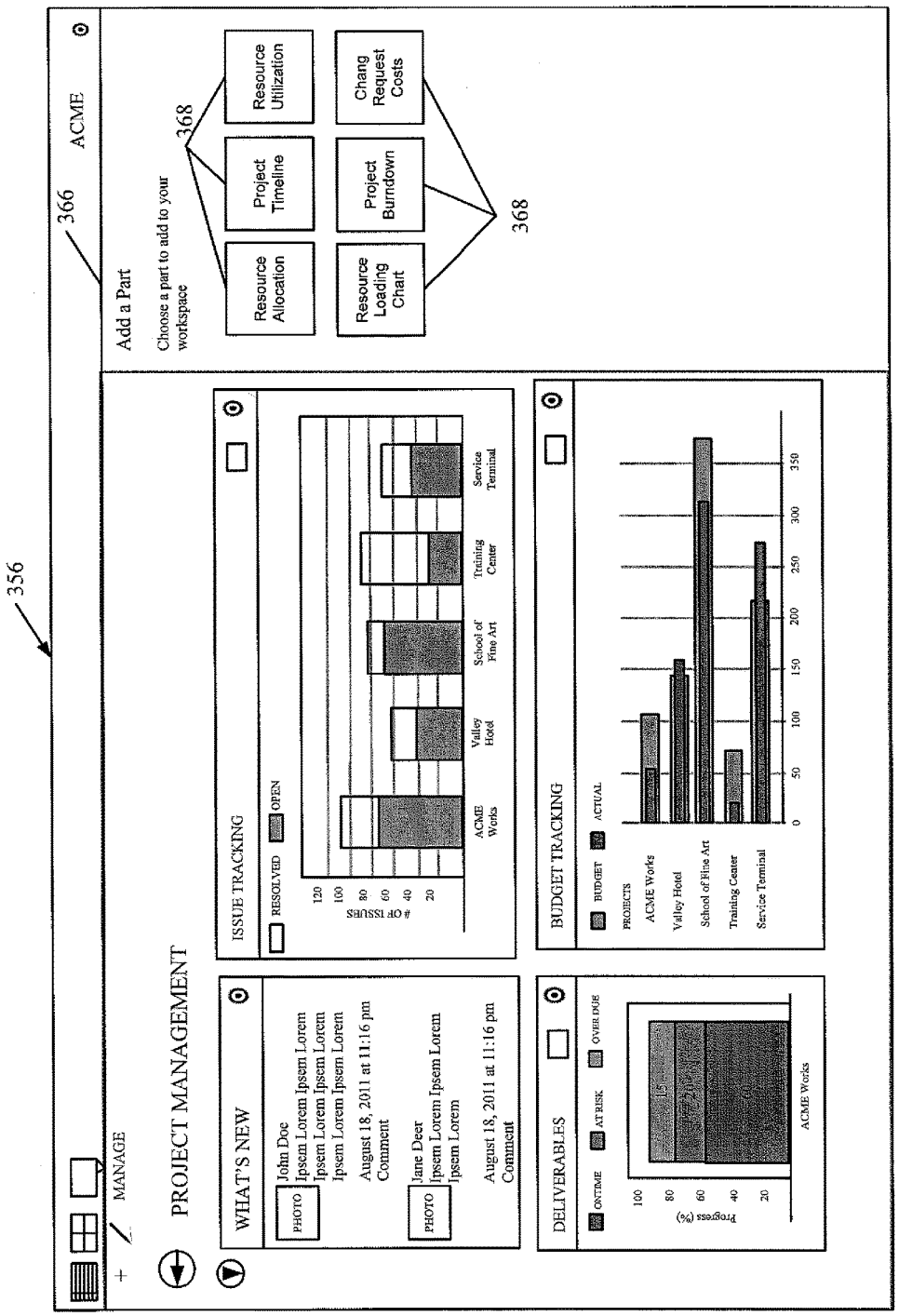

FIG. 4 is a flow diagram illustrating one embodiment of the overall operation of system 100 in adding a group or a component to a workspace display. FIGS. 4A-4D are illustrative user interface displays. FIGS. 4-4D will now be described in conjunction with one another.

Display customization component 116 first receives a user input identifying information to be added to the user's workspace. This is indicated by block 350 in FIG. 4. The user can do this in a wide variety of different ways. For instance, it may be that user 106 is simply navigating through the business system 100, performing his or her day-to-day tasks. The user 106 may then decide that information on a particular form, a chart, or other set of information or item of information is to be added to the user's workspace display. In that case, the user can select that item of information and actuate an appropriate user input mechanism (such as a pin input button on a command bar) to indicate that the user wishes to add this item of information to his or her workspace display. This is indicated by block 352 in FIG. 2. In essence, the user, in performing his or her tasks, can select information to be added to the workspace from within business system 100. Visualization component 114 then adds the new information to the workspace display 128 for the user 106.

In another embodiment, the user 106 can invoke a command bar or slide-in panel with user input mechanisms that allow the user 106 to identify a particular item of information to be added to the user's workspace display 128. This is indicated by block 354 in FIG. 4. FIGS. 4A and 4B show illustrative user interface displays that indicate this. FIG. 4A shows a user interface display 356 that includes a workspace display 358 with a plurality of groups, each represented by one or more components. Display 356 also includes a command bar 360 that has a plurality of buttons. By actuating the new button 362 or the pin button 364, the user causes display customization component 116 to display a slide-in panel that allows the user to choose from a list of available items that can be added to the workspace display 358. FIG. 4B shows slide-in panel 366 that includes a plurality of different user input mechanisms 368, each of which corresponds to a different item of information (or a different set of information or form or other part of system 100) that can be added to this particular user's workspace display 358. It will be noted that the user input mechanisms 368 only allow user 106 to add items (or other parts of system 100) that the user has access to, based upon the users role.

The user 106 can add items to the workspace in other ways as well, other than the two ways described above with respect to blocks 352 and 354. This is indicated by block 370.

In any case, identifying a particular item of information to be added to the user's workspace display is indicated by block 350 in the flow diagram of FIG. 4.

Once the user has identified an item of information to be added to the workspace display, display customization component 116 illustratively generates a dialog to allow user 106 to define the particular format and location where the new item is to be displayed on the workspace display. This is indicated by block 372. This can include a wide variety of different information. For instance, it can allow user 106 to indicate that the item is to be displayed in a new group 374 on the workspace display. It can also enable the user to indicate that this item is simply a new component of an existing group as indicated by block 376. It can allow user 106 to specify the component type (such as chart, list, activity feed, card, etc.) as indicated by block 378. It can allow the user to specify the component size as indicated by block 380. It can allow the user to specify the position on the workspace display as indicated by block 382, and it can allow the user to specify other information as well, as indicated by block 384.

Figure 4C:
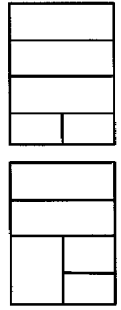
Figure 4D:
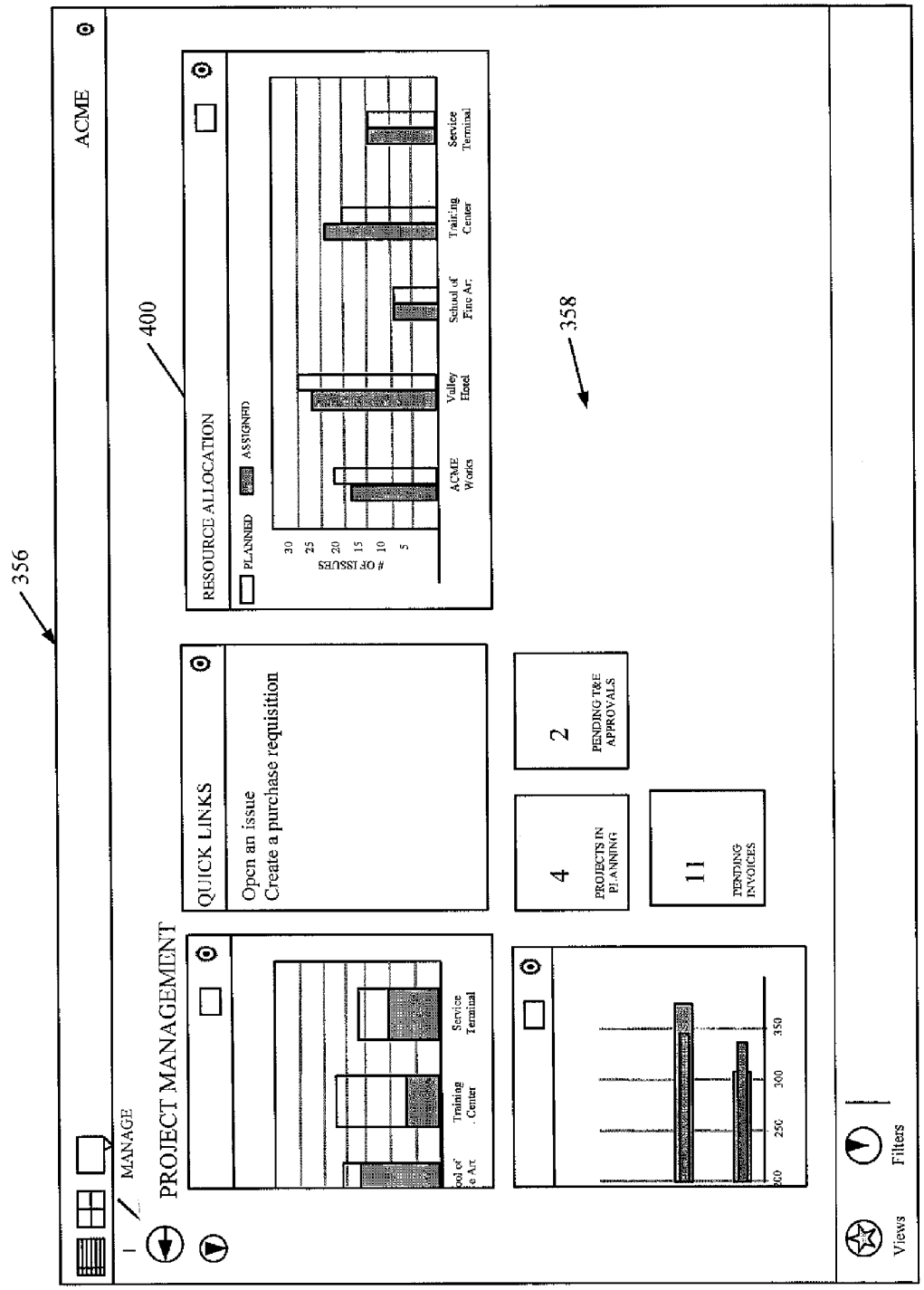

FIGS. 4C and 4D are illustrative user interface displays that show this. FIG. 4C shows that, once the user has identified a particular item of information to be added to the workspace display, a customization pane 386 is displayed. Customization pane 386 illustratively includes a descriptive portion 388 that describes the particular item of information to be added to the workspace display. In the embodiment shown in FIG. 4C, the user has selected the "resource allocation" item of information, and description portion 388 indicates that this portion displays planned versus assigned resources across all projects. Pane 386 also allows the user to select a component type using selector 390. In the embodiment shown, the user can add the "resource allocation" item of information as either a chart or a list. Of course, other types of information may be available in other component types as well.

Pane 386 also allows user 106 to specify the component size using size selector 392. In one embodiment, once the user has made desired selections, the user simply actuates the add to workspace button 394, and display customization component 116 automatically adds the identified information to the workspace display in the identified display format (e.g., the component type, the size, the location, etc.). This is indicated by block 396 in the flow diagram of FIG. 4.

It will be noted that the item of information can be added to the workspace display in other ways as well. For instance, it can be automatically added to the far right side of the workspace display, as a default. The user can then illustratively reposition the newly added component or group by dragging and dropping it to a new location within the workspace display, as discussed above. By way of example, FIG. 4D shows one embodiment of user interface display 356 showing the workspace display for the user, with the newly added "resource allocation" component 400 added to the far right hand side of the workspace display 358.

Figure 5:
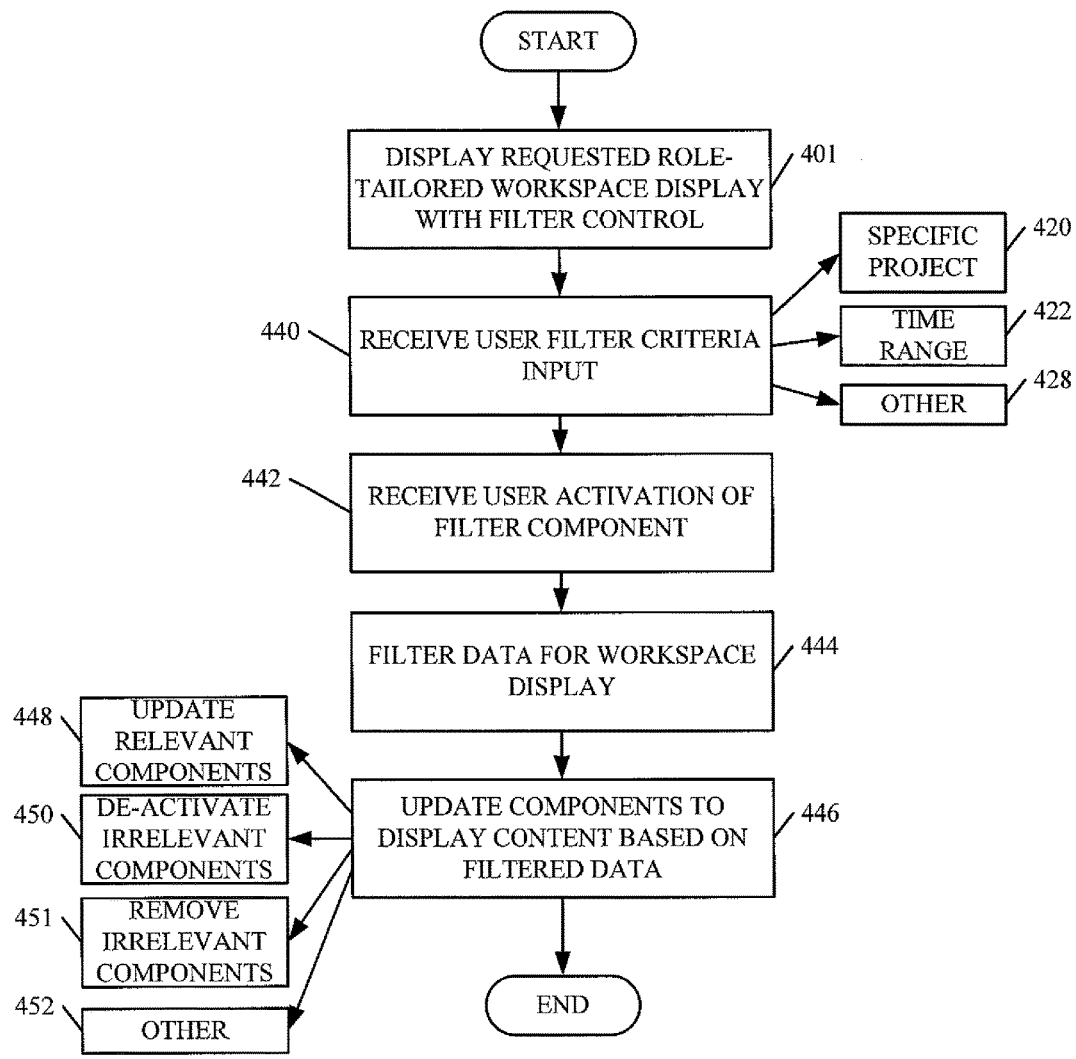
FIG. 5 is a flow diagram showing one embodiment of the operation of the system shown in FIG. 1 in filtering data on the workspace display.
Figure 5A:
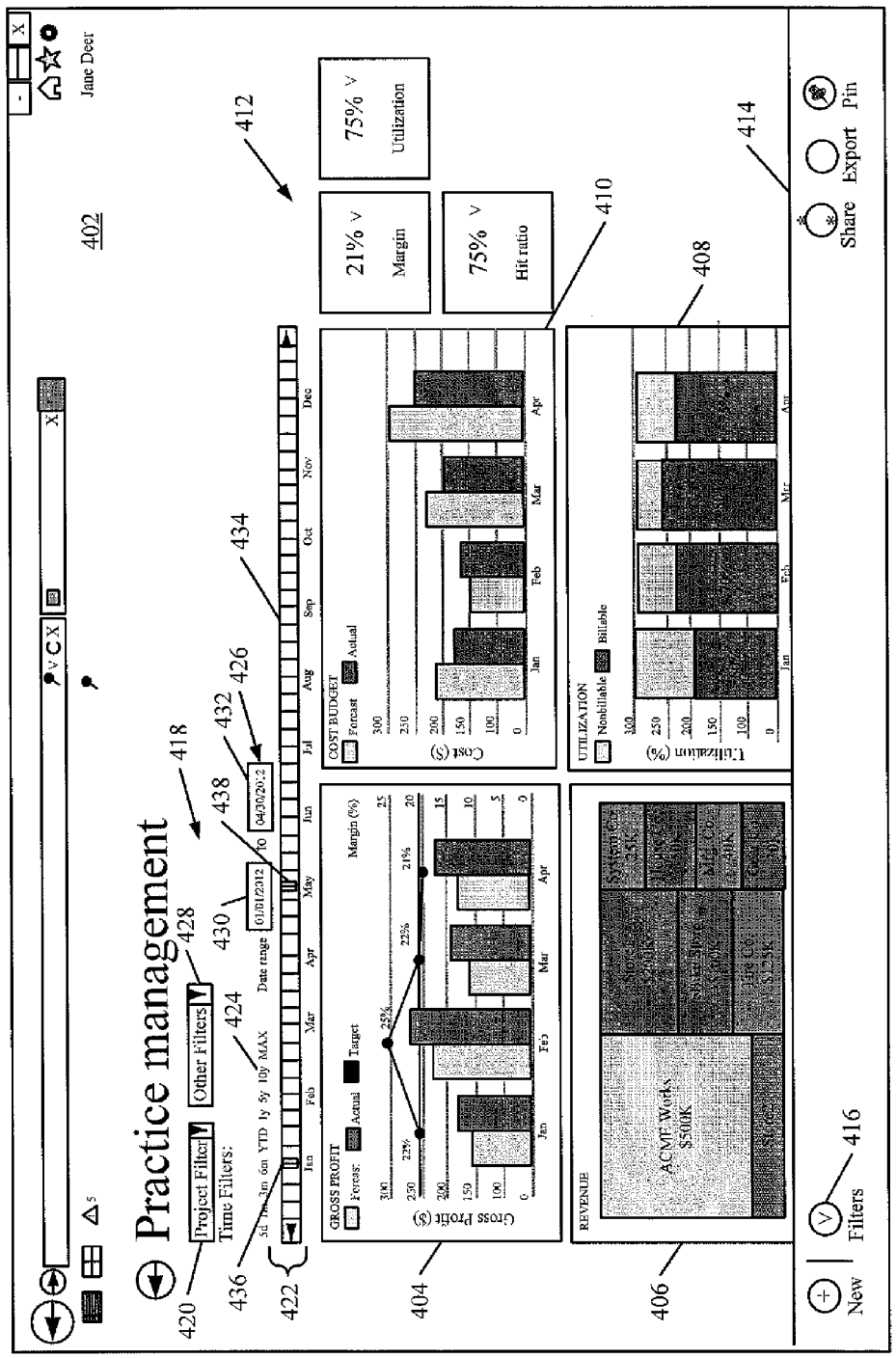
FIGS. 5A and 5B are illustrative user interface displays.
Figure 5B:
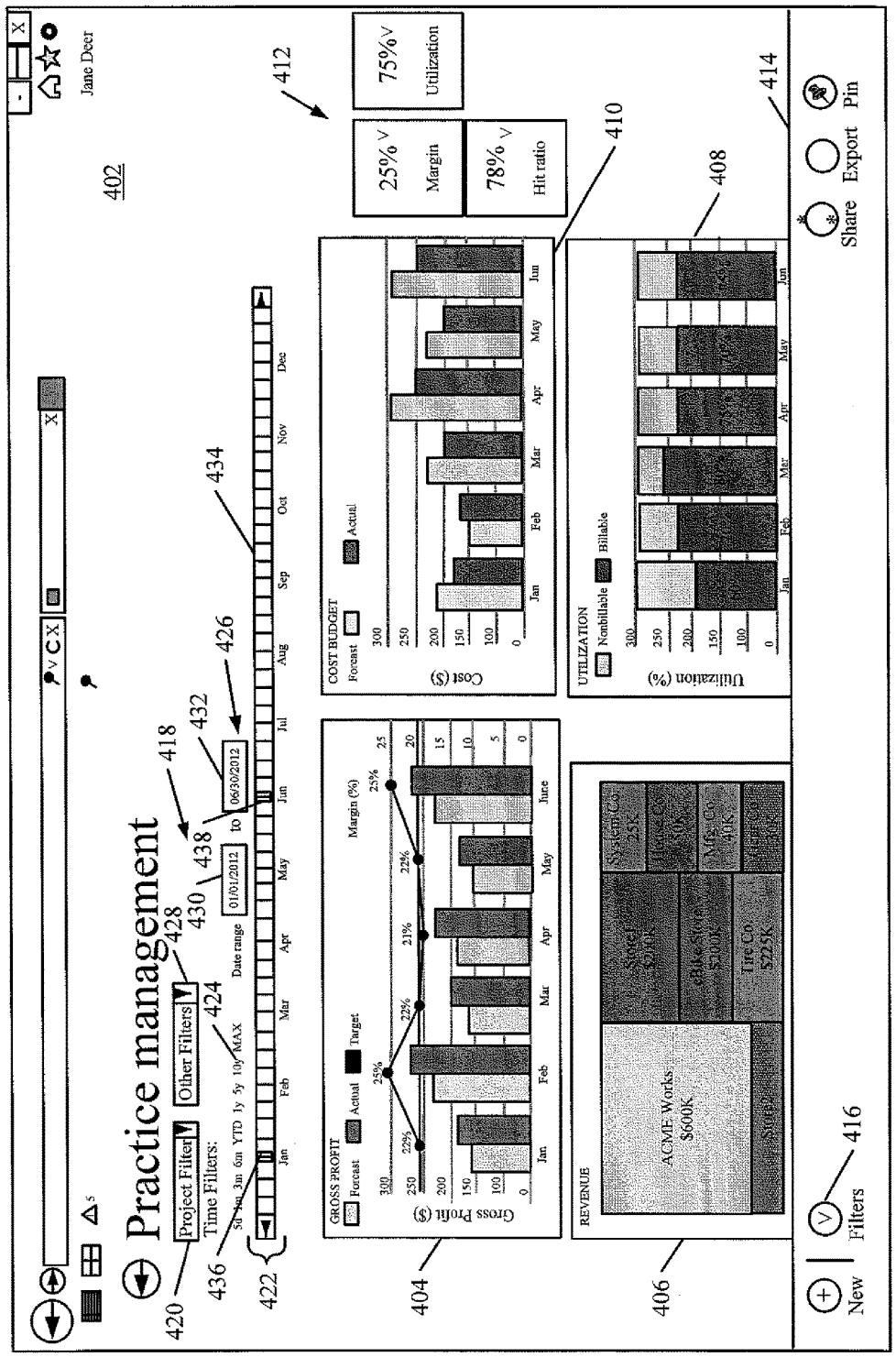

FIG. 5 is a flow diagram illustrating one embodiment of the operation of business system 100 (and filtering component 117) in allowing user 106 to filter the content displayed on a workspace display 128. FIGS. 5A and 5B are illustrative user interface displays that illustrate this. FIGS. 5-5B will now be described in conjunction with one another.

It is first assumed that visualization component 114 is displaying a requested workspace display 128. In one embodiment, the workspace display being shown has one or more filter controls that allow user 106 to filter the content displayed thereon. FIG. 5A shows one embodiment of a workspace display 402. It can be seen that workspace display 402 includes a set of charts 404, 406, 408 and 410, as components. In addition, the components on workspace display 402 include a set of tiles shown generally at 412. Workspace display 402 also illustratively includes an application bar 414 that includes a filter control 416. In addition, workspace display 402 includes a set of filter criteria mechanisms 418 that allow user 106 to set filter criteria to filter the content displayed on workspace display 402. Displaying the requested workspace display with filter controls is indicated by block 401 in FIG. 5.

In the embodiment shown in FIG. 5A, mechanisms 118 include project filter mechanism 420, a set of time filters 422 that include selectable filter buttons 424 and a date range mechanism 426. Mechanisms 418 also include other filter mechanisms 428.

In the displayed embodiment, project filters mechanism 420 is a dropdown menu that allows user 106 to filter the content of workspace display 402 by selecting one or more projects from the dropdown menu that appears when mechanism 420 is actuated. Selectable time filter mechanisms 424 allow user 106 to select a time period, such as the most recent five days, one month, three months, six months, year-to-date, one year, five year, ten year, and maximum time ranges. Date range mechanism 426 allows the user to select a starting date in box 430 and an ending date in box 432. Similarly, a timeline mechanism 434 allows the user to simply drag sliders 436 and 438 to a given location along timeline 434, in order to adjust the date range for the filtered display. Of course, it will be appreciated that other filter mechanisms 418 can be used as well, and those shown in FIG. 5A are shown for exemplary purposes only.

In the specific embodiment shown in FIG. 5A, the user has set the filter criteria (or the filter criteria have defaulted to) showing data during a four month period from Jan. 1, 2012 to Apr. 30, 2012. Thus, all of the charts 404-410 and tiles 412 show data corresponding to that filtered date range.

However, user 106 can change the filter criteria by providing a user filter criteria input using one of mechanisms 418. This is indicated by block 440 in FIG. 5. With respect to the examples shown in FIG. 5A, the user can select filter criteria by actuating the project filter mechanism 420, one of the time filters 422, or one of the other filter mechanism 428.

FIG. 5B shows one embodiment of user interface display 402 that indicates this. The display in FIG. 5B is similar to that shown in FIG. 5A and similar items are similarly numbered. FIG. 5B shows that the user has now changed the date range in box 532 to end at Jun. 30, 2012, instead of Apr. 30, 2012. Again, the user can do this in one of a variety of different ways. For instance, the user can select box 432 and simply type in the new ending date. Alternatively, the user can grab slider 438 and slide it to the right to the desired ending date. Of course, the user can do this in other ways as well.

Once the user has set the new filter criteria, user 106 illustratively actuates filter button 416. This activates filter component 117 to filter the data provided to visualization component 114 based on the new filter criteria. Activating filter component 117 is indicated by block 442 in FIG. 5.

In response, filter component 117 accesses data in data store 108 (or it access the data already displayed on display 402) and filters it based on the new filter criteria. Filtering the data for the workspace display is indicated by block 444 in FIG. 5.

Visualization component 114 then updates the components on workspace display 402 based upon the filtered data. This is indicated by block 446 in FIG. 5. In one embodiment, visualization component 114 updates the relevant components in workspace display 402. This is indicated by block 448. It may turn out that some components on a given user's workspace display are not relevant (once new filter criteria have been set). In this case, those components can be visually indicated as deactivated (such as being grayed out on the display) to indicate that the filter criteria do not apply to those components. This is indicated by block 450 in FIG. 5. They can also be removed from the workspace display, as indicated by block 451. Visualization component 114 can display the components in other ways as well, based upon the newly filtered data provided to it. This is indicated by block 452 in FIG. 5.

It can be seen in FIG. 5B that all of the charts 404-410 have been updated so that they now begin in January and end in June. Similarly, the numbers on the revenue chart 406 have been revised to show higher revenue numbers. Also, tiles 412 have also been revised to show updated numbers, given the newly filtered data (which now includes two additional months of data over that shown in FIG. 5A).

It will be appreciated that the filter criteria and filter input mechanisms provided for a user on a given workspace display can vary widely from those shown in FIGS. 5A and 5B. They can also vary based upon the role assigned the given user for whom the workspace display has been generated. For instance, a user having an administrative role may have completely different filter mechanisms than a user in a sales management role. Some filter mechanisms can be common to all roles, or all of the filter mechanisms can be common to all roles. All of these configurations are contemplated herein.

In addition, the particular filter mechanisms can vary based upon the given workspace display. For instance, if a user (even though he or she only has a single role) has access to multiple workspace displays, each workspace display may have different filter mechanisms (depending upon the data displayed thereon). Other variations in filter mechanisms can be made as well.

It can thus be seen that the workspace display aggregates information for a user, based upon the user's role. The information can be grouped according to the tasks performed by a user in the given role, and each group can have one or more components. Each component can be one of a variety of different component types, and illustratively represents an item of information, a task, an activity, an entity, another kind of data record, etc. The user can illustratively pan the workspace display to view all of the different groups, and can scroll vertically within a group to view all components in that group. The user can interact with the components to view more detailed information, to perform tasks or activities, or to customize the workspace display to delete components or groups, add components or groups, reorder them, or perform other operations. The user can filter data on the workspace display by providing filter inputs. The user can also illustratively choose from among a plurality of different workspace displays. This can happen, for instance, where the user's role corresponds to two or more workspace displays, or where the user has multiple roles, each with its own workspace display.

Figure 6:
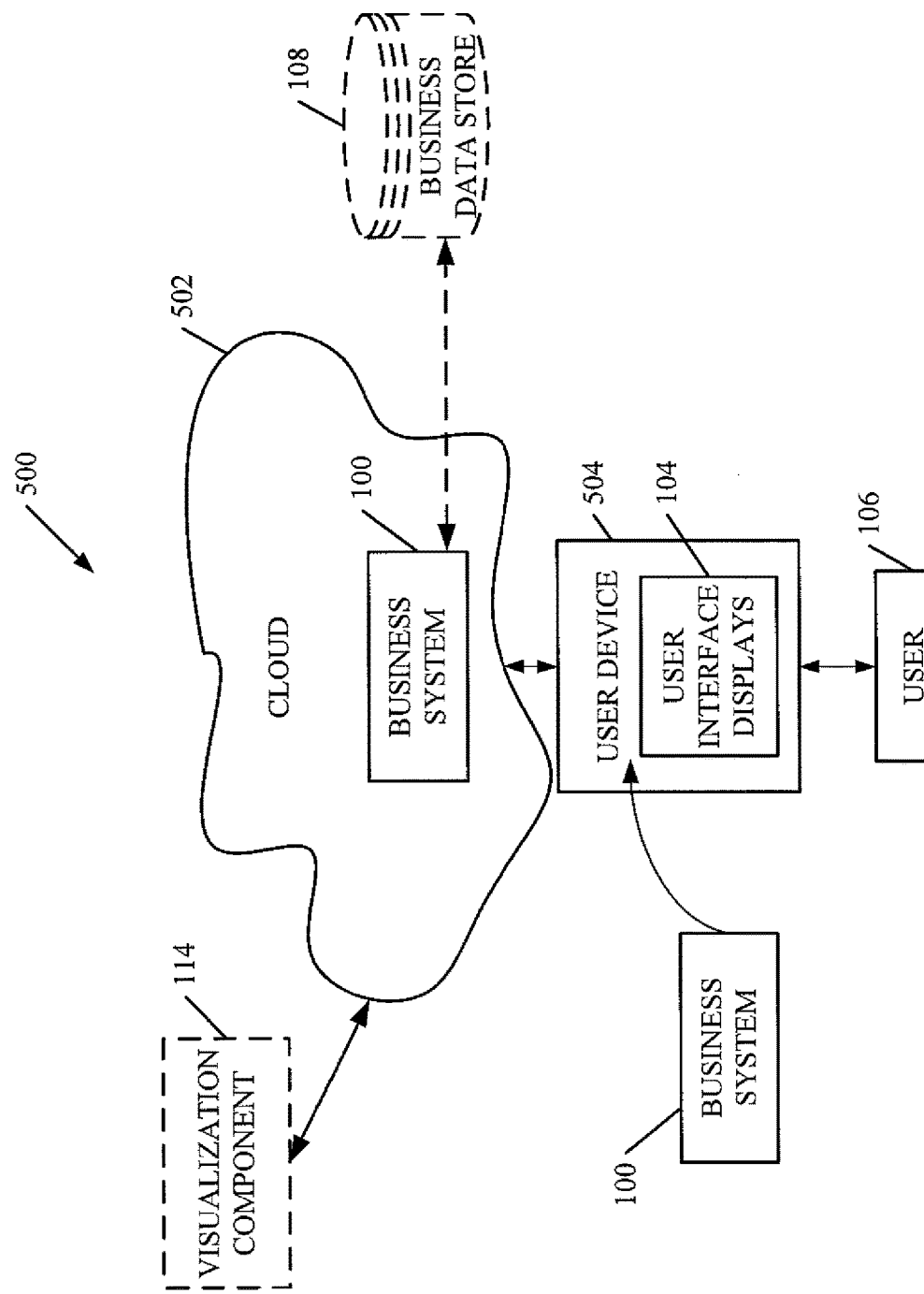
FIG. 6 is a block diagram showing the system of FIG. 1 in various architectures.

FIG. 6 is a block diagram of business system 100, shown in FIG. 1, except that it's elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that business system 100 is located in cloud 502 (which can be public, private, or a combination where portions are public while others are private). Therefore, user 106 uses a user device 504 to access the system through cloud 502.

FIG. 6 also depicts another embodiment of a cloud architecture. FIG. 6 shows that it is also contemplated that some elements of system 100 are disposed in cloud 502 while others are not. By way of example, data store 108 can be disposed outside of cloud 502, and accessed through cloud 502. In another embodiment, visualization component 114 is also outside of cloud 502. Also, some or all of system 100 can be disposed on device 504. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
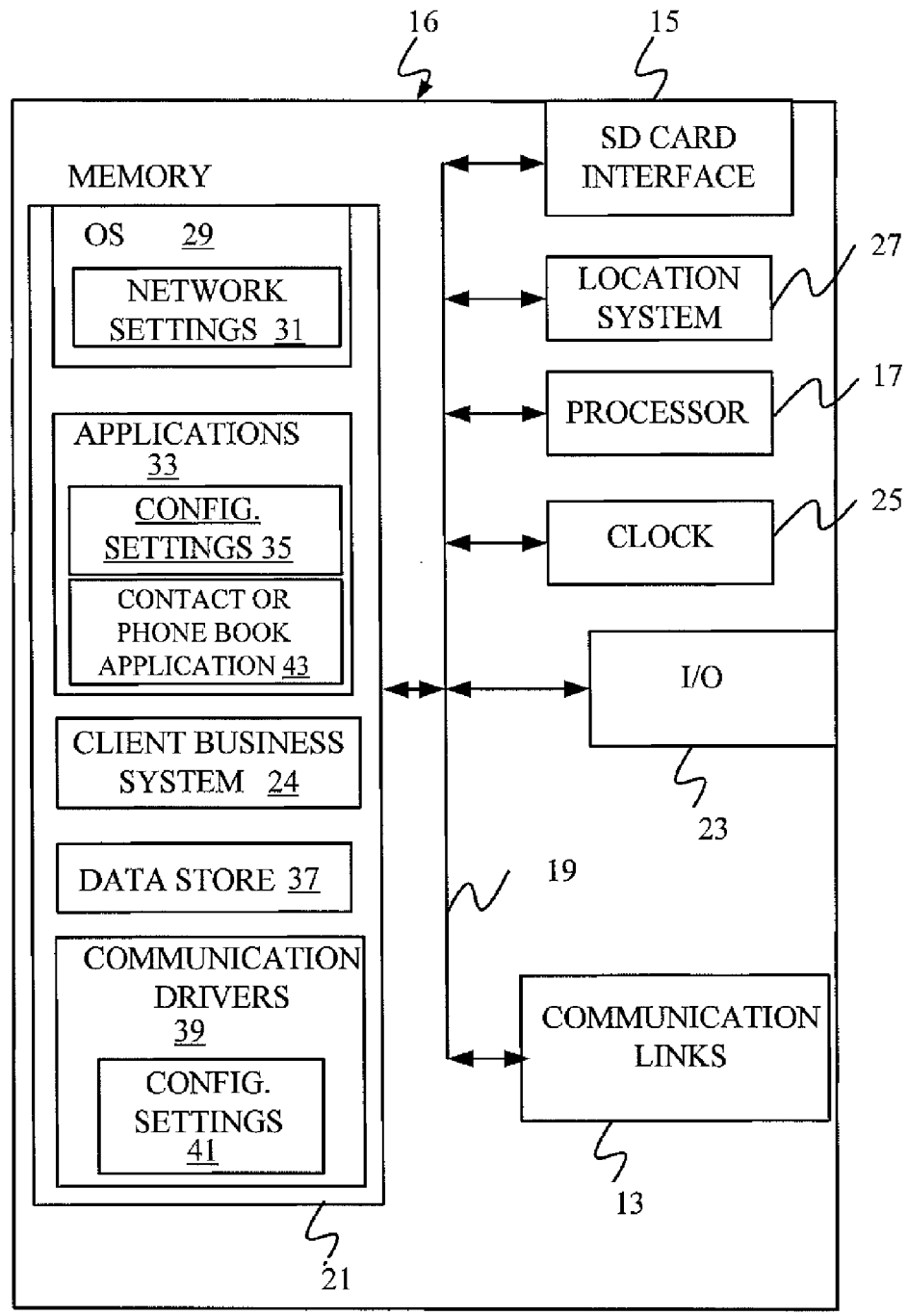
FIGS. 7-12 show different embodiments of mobile devices.

FIG. 7 is a simplified block diagram of one illustrative embodiment of a handheld or mobile computing device that can be used as a user's or client's hand held device 16, in which the present system (or parts of it) can be deployed. FIGS. 8-12 are examples of handheld or mobile devices.

FIG. 7 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 112 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
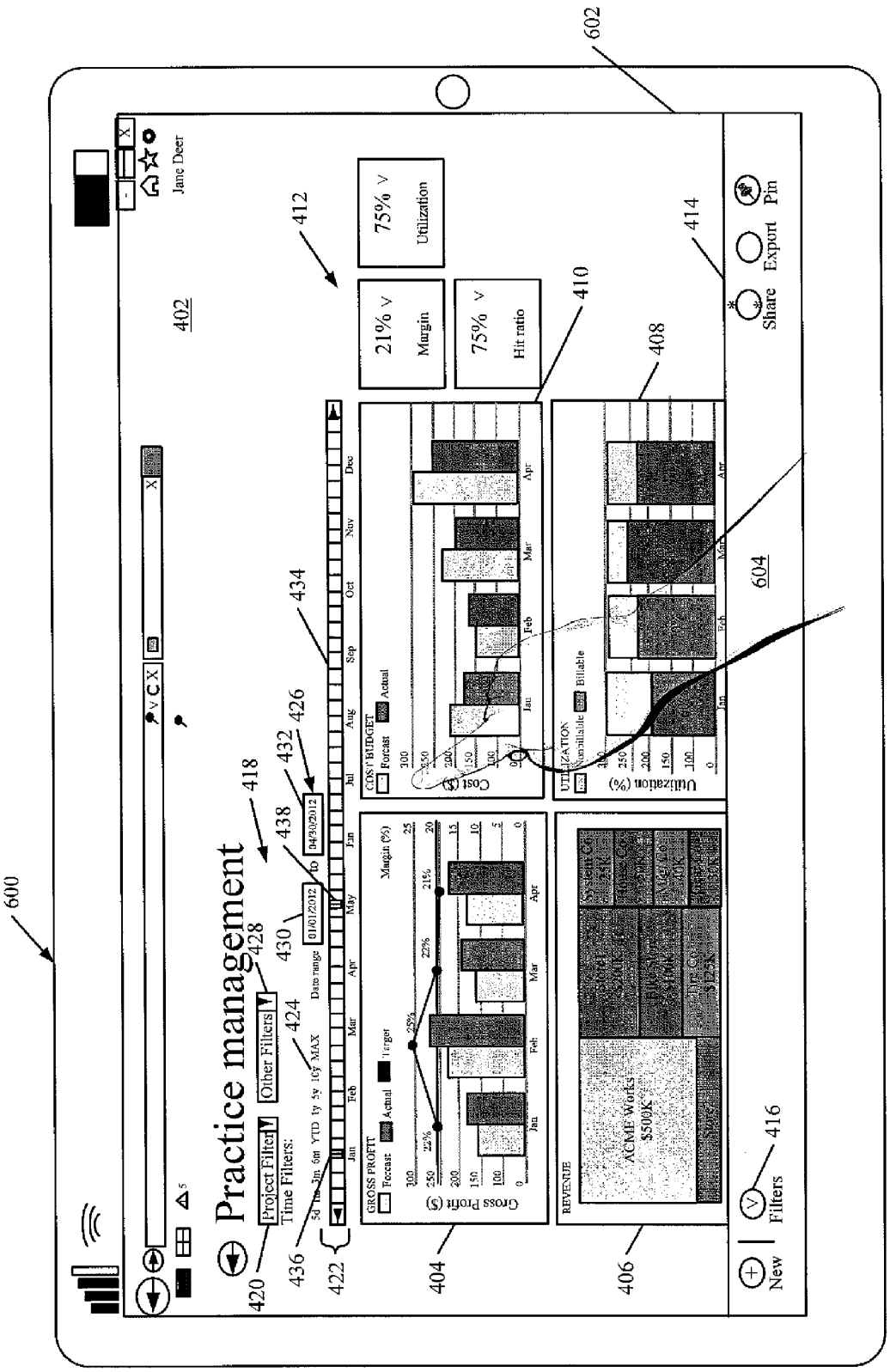

FIG. 8 shows one embodiment in which device 16 is a tablet computer 600. In FIG. 8, computer 600 is shown with user interface display from FIG. 5A displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
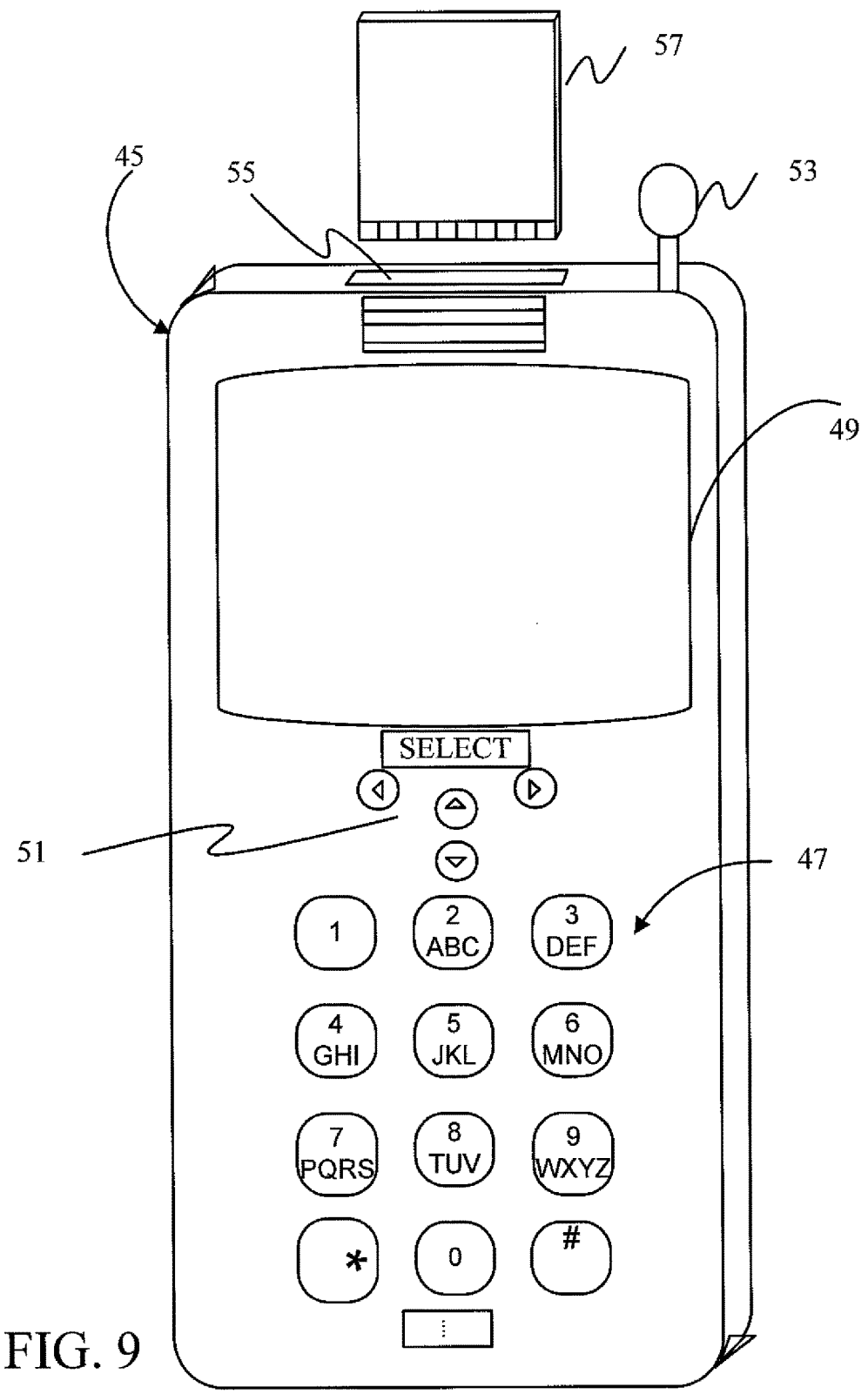
Figure 10:
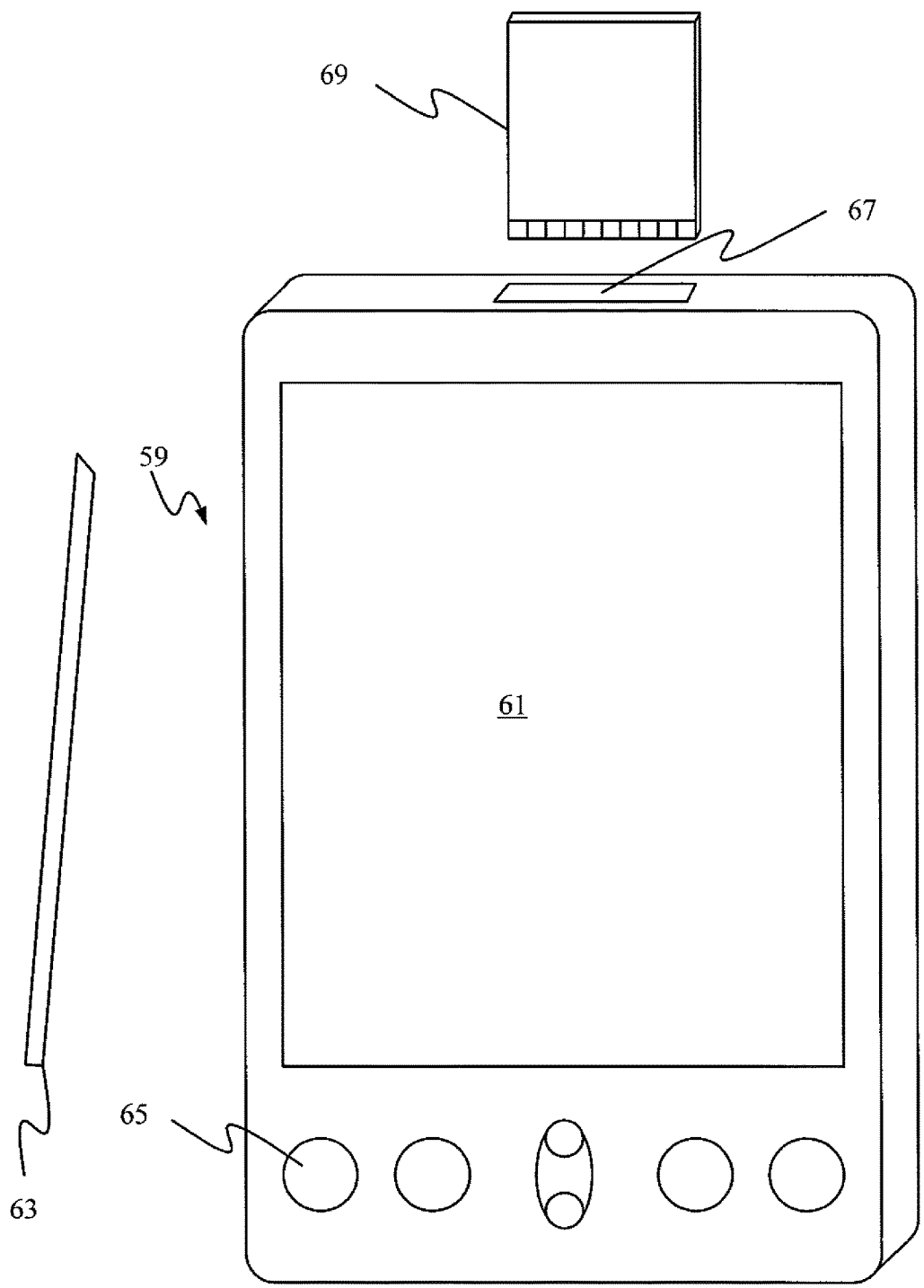

FIGS. 9 and 10 provide additional examples of devices 16 that can be used, although others can be used as well. In FIG. 9, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
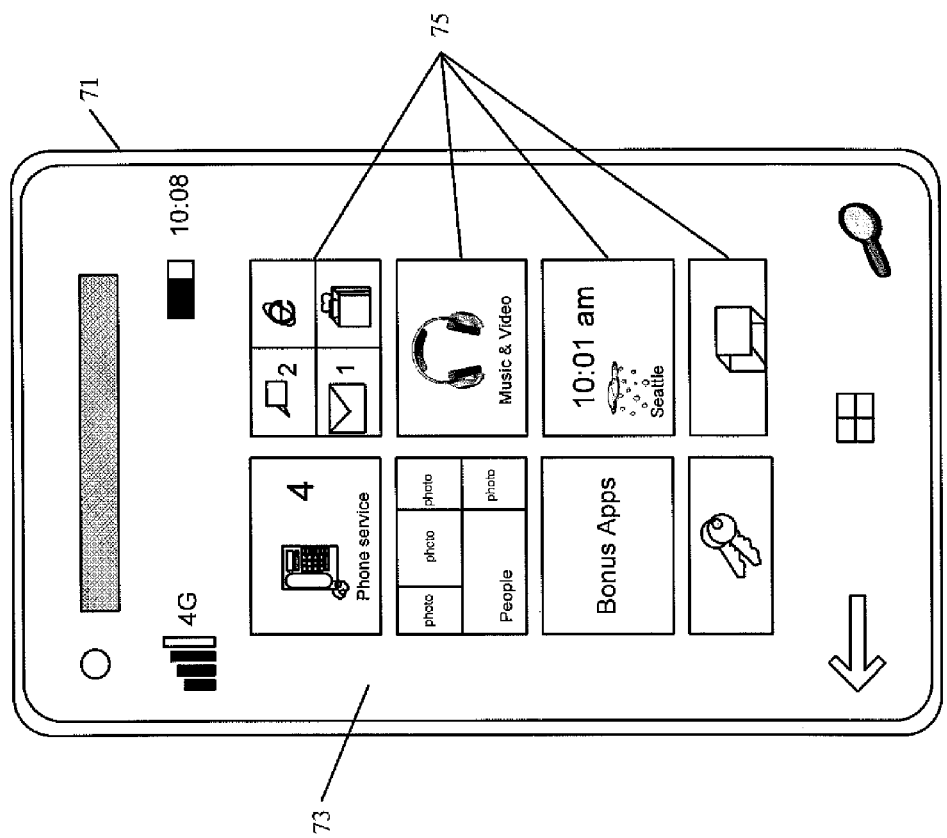
Figure 12:
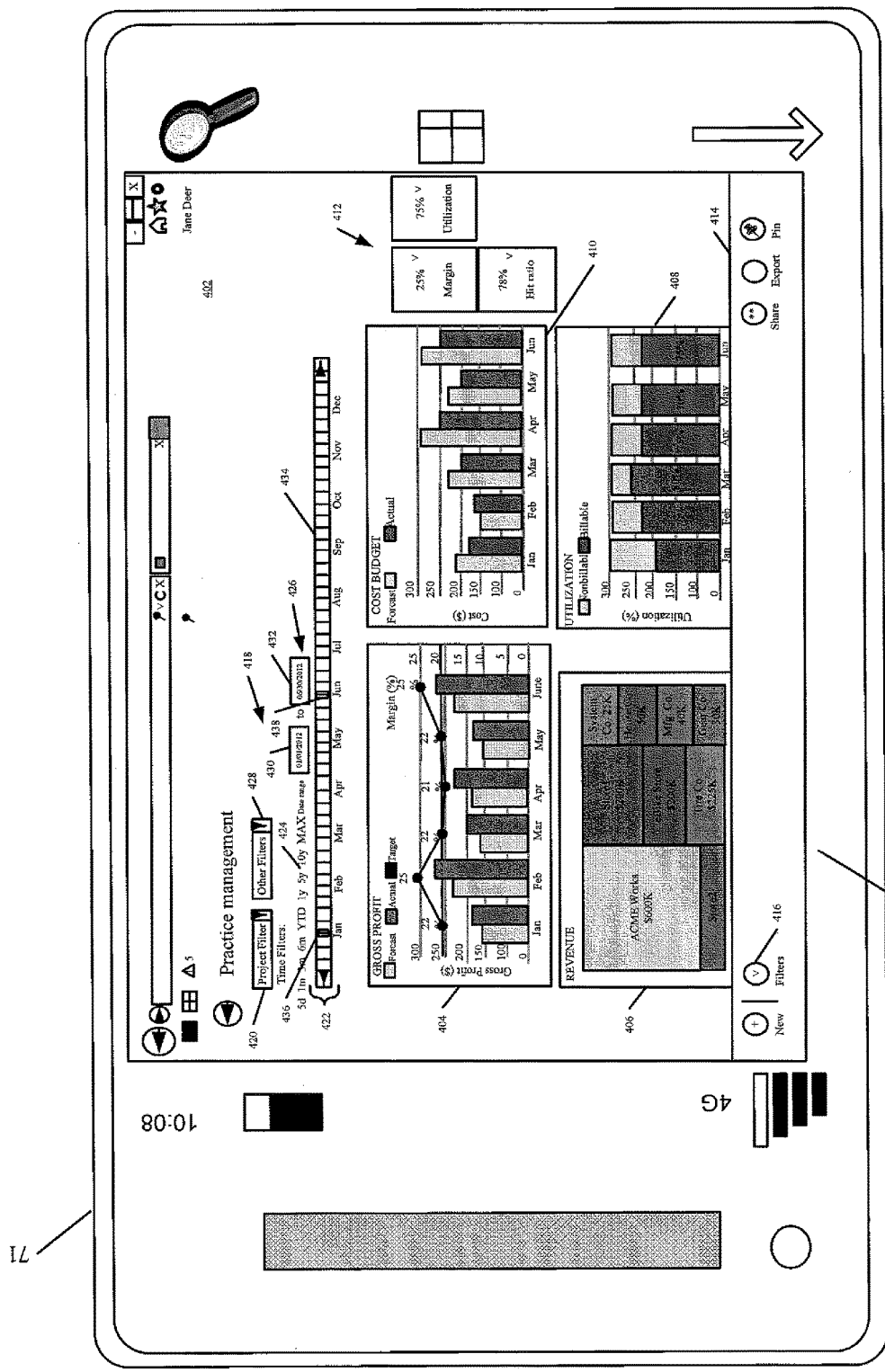

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 12 shows smart phone 71 with the display of FIG. 5B on it.

Note that other forms of the devices 16 are possible.

Figure 13:
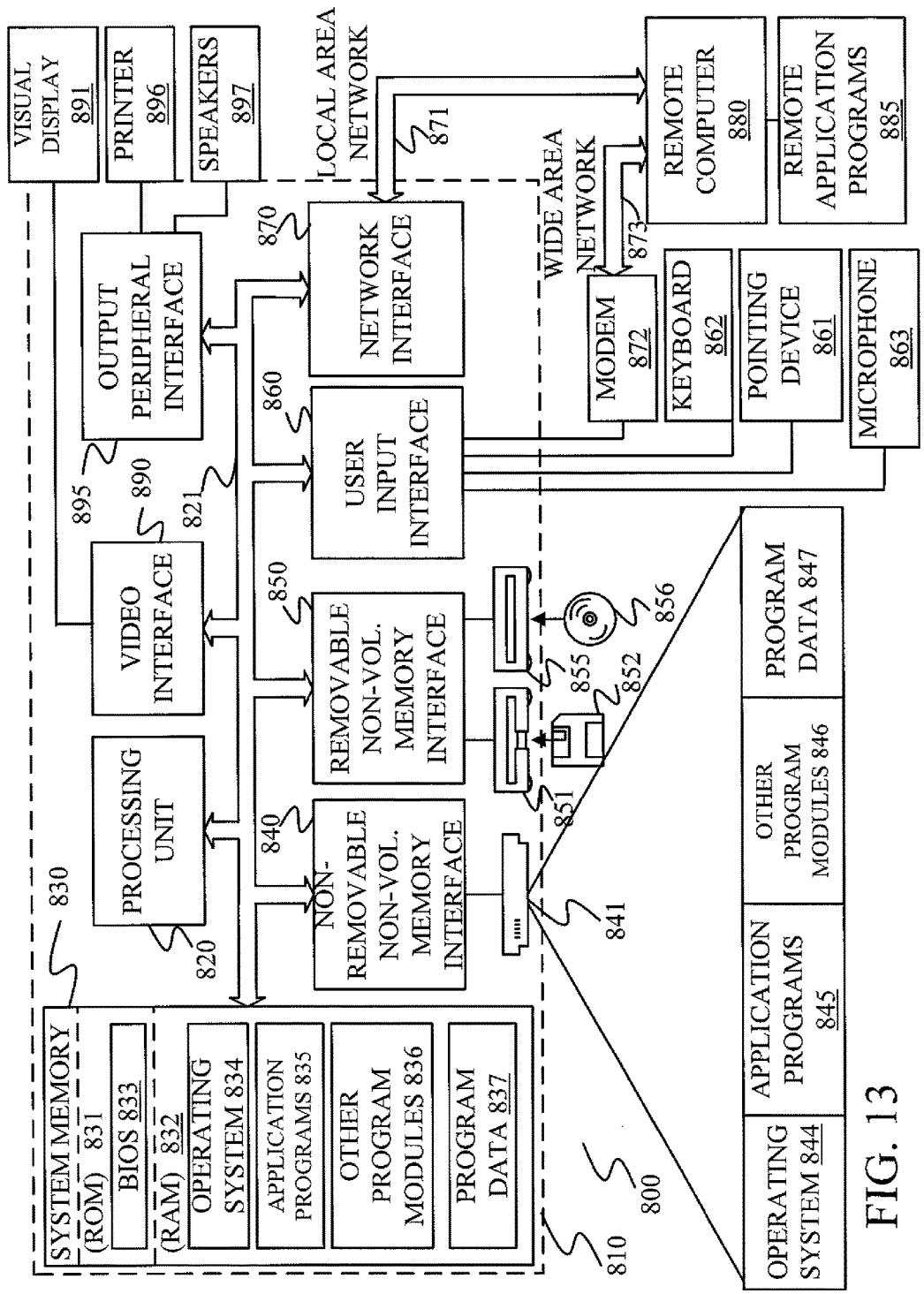
FIG. 13 is a block diagram of one illustrative computing environment.

FIG. 13 is one embodiment of a computing environment in which system 100, or parts of it, (for example) can be deployed. With reference to FIG. 13, an exemplary system for implementing some embodiments includes a general-purpose computing device in the form of a computer 810. Components of computer 810 may include, but are not limited to, a processing unit 820 (which can comprise processor 112), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
generating a representation of a workspace display with a plurality of groups of components representing a plurality of different tasks associated with a user role, wherein each group corresponds to a particular one of the different tasks and each component in the group comprises a user-actuatable input control that visually represents information related to the particular task in the computer system and is actuatable to perform an action related to the particular task;
generating a representation of a filter criterion user input mechanism on the workspace display, the filter criterion user input mechanism comprising a slider control that is actuatable between a plurality of different positions;
receiving an indication of user actuation of the slider control; and
using a computer processor to dynamically update the representation of the workspace display by:
detecting motion of the slider control;
identifying a filter criterion based on the detected motion;
globally applying the identified filter criterion to the plurality of groups of components, wherein globally applying comprises identifying filtered data by filtering the information based on the identified filter criterion; and
updating each of the plurality of groups of components based on the filtered data.

2. The computer-implemented method of claim 1 wherein the groups of components comprise at least a first group having a first component with a first type of data visualization and a second group having a second component with a second type of data visualization that is different than the first type of data visualization, and wherein updating each of the plurality of groups of components comprises updating display of the first and second components based on the filtered data.

3. The computer-implemented method of claim 2, wherein each of the first and second types of data visualizations comprise one of:
a tile; a list; an activity feed; a chart; a quick link; an image; a label/value pair; a calendar; a map; or a card.

4. The computer-implemented method of claim 1, and further comprising:
based on the filter criterion, identifying a particular one of the components to which the filter criterion does not apply;
deactivating the particular component such that the particular component is non-actuatable by the user; and
updating the representation of the workspace display to change the visual appearance of the particular component to indicate the particular component as a deactivated component.

5. The computer-implemented method of claim 1, and further comprising:
identifying a particular one of the components to remove from the workspace display based on the filter criterion, the particular component being in a particular one of the groups; and
updating the representation of the workspace display by removing the particular component from the particular group while another component in the particular group remains displayed in the particular group.

6. The computer-implemented method of claim 1 and further comprising:
identifying a role-based set of filter criterion based on the user role assigned to the user; and
generating the representation of the workspace display to include a role-based set of filter criterion user input mechanisms that represent, and are actuatable to select, the role-based set of filter criterion.

7. The computer-implemented method of claim 1 and further comprising:
identifying a workspace display-based set of filter criterion based on the workspace display; and
generating the representation of a workspace display-based set of filter criterion user input mechanisms that represent and are actuatable to select the workspace display-based set of filter criterion.

8. The computer-implemented method of claim 1 wherein generating the representation of the workspace display comprises:
generating a representation of a workspace selection display with a workspace selector;
receiving an indication of actuation of the workspace selector; and
generating the representation of the workspace display based on the indication of actuator of the workspace selector.

9. The computer-implemented method of claim 1 wherein generating the representation of the workspace display comprises:
receiving an indication of a user role assigned to the user;
identifying that the user role has a plurality of associated workspace displays; and
generating a representation of a user actuatable workspace selector for each of the identified workspace displays.

10. The computer-implemented method of claim 1 wherein generating the representation of the workspace display comprises:
receiving an indication of a user identity;
determining that the user identity is assigned to a plurality of different user roles;
identifying workspace displays for each of the plurality of different user roles; and
generating a representation of a user actuatable workspace selector for each identified workspace display.

11. A computing system comprising:
a processor; and
memory storing instructions executable by the at least one processor, wherein the instructions configure the computing system to:
generate a representation of a workspace display with a plurality of groups of components representing a plurality of different tasks associated with a user role, wherein each group corresponds to a particular one of the different tasks and each component in the group comprises a user-actuatable input control that visually represents information related to the particular task in the computer system and is actuatable to perform an action related to the particular task;
generate a representation of a filter criterion user input mechanism on the workspace display, the filter criterion user input mechanism comprising a slider control that is actuatable between a plurality of different positions;

receive an indication of user actuation of the slider control;
detect motion of the slider control;
identify a filter criterion based on the detected motion;
globally apply the filter criterion to the plurality of groups of components to identify filtered data, wherein the filtered data is identified by filtering the information based on the filter criterion; and
modify the representation of the workspace display by dynamically updating each of the plurality of groups of components based on the filtered data.

12. The computing system of claim 11 wherein the groups of components comprise at least a first group having a first component with a first type of data visualization and a second group having a second component with a second type of data visualization that is different than the first type of data visualization, and wherein the instructions configure the computing system to update display of the first and second components based on the filtered data.

13. The computing system of claim 12, wherein each of the first and second types of data visualizations comprise one of:
a tile; a list; an activity feed; a chart; a quick link; an image; a label/value pair; a calendar; a map; or a card.

14. The computing system of claim 11, wherein the instructions configure the computing system to:
based on the filter criterion, identify a particular one of the components to which the filter criterion does not apply;
deactivate the particular component such that the particular component is non-actuatable by the user; and
update the representation of the workspace display to change the visual appearance of the particular component to indicate the particular component as a deactivated component.

15. The computing system of claim 11, wherein the instructions configure the computing system to:
identify a particular one of the components to remove from the workspace display based on the filter criterion, the particular component being in a particular one of the groups; and
update the representation of the workspace display by removing the particular component from the particular group while another component in the particular group remains displayed in the particular group.

16. The computing system of claim 11, wherein the instructions configure the computing system to:
identify a role-based set of filter criterion based on the user role assigned to the user; and
generate the representation of the workspace display to include a role-based set of filter criterion user input mechanisms that represent, and are actuatable to select, the role-based set of filter criterion.

17. The computing system of claim 11, wherein the instructions configure the computing system to:
identify a workspace display-based set of filter criterion based on the workspace display; and
generate the representation of a workspace display-based set of filter criterion user input mechanisms that represent, and are actuatable to select, the workspace display-based set of filter criterion.

18. The computing system of claim 11, wherein the instructions configure the computing system to:
generate a representation of a workspace selection display with a workspace selector;
receive an indication of actuation of the workspace selector; and
generate the representation of the workspace display based on the indication of actuator of the workspace selector.

19. The computing system of claim 11, wherein the instructions configure the computing system to:
receive an indication of a user role assigned to the user;
identify that the user role has a plurality of associated workspace displays; and
generate a representation of a user actuatable workspace selector for each of the identified workspace displays.

20. The computing system of claim 11, wherein the instructions configure the computing system to:
receive an indication of a user identity;
determine that the user identity is assigned to a plurality of different user roles;
identify workspace displays for each of the plurality of different user roles; and
generate a representation of a user actuatable workspace selector for each identified workspace display.

* * * * *